United States Patent
Oshima et al.

(10) Patent No.: US 11,557,138 B2
(45) Date of Patent: Jan. 17, 2023

(54) DISPLAY APPARATUS, CONTROL METHOD, AND RECORDING MEDIUM

(71) Applicants: Yoshiaki Oshima, Kanagawa (JP); Susumu Fujioka, Kanagawa (JP)

(72) Inventors: Yoshiaki Oshima, Kanagawa (JP); Susumu Fujioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/376,178

(22) Filed: Jul. 15, 2021

(65) Prior Publication Data
US 2022/0019782 A1 Jan. 20, 2022

(30) Foreign Application Priority Data
Jul. 17, 2020 (JP) .............................. JP2020-123252

(51) Int. Cl.
G06V 30/10 (2022.01)
G06V 30/32 (2022.01)
G06V 10/44 (2022.01)

(52) U.S. Cl.
CPC ............ G06V 30/36 (2022.01); G06V 10/443 (2022.01); G06V 30/347 (2022.01); G06V 30/10 (2022.01)

(58) Field of Classification Search
CPC ................. G06F 1/32–3296; G06V 30/00–43
See application file for complete search history.

(56) References Cited

U.S. PATENT DOCUMENTS

| | | | |
|---|---|---|---|
| 8,903,458 B1* | 12/2014 | Ho .................. | H04W 52/0261 455/574 |
| 8,942,771 B1* | 1/2015 | Ho .................. | H04W 52/0261 455/574 |
| 9,305,227 B1* | 4/2016 | Nambiar ............ | G06K 9/6292 |
| 2004/0141647 A1* | 7/2004 | Kisuki .............. | G06F 1/3203 382/187 |
| 2005/0182983 A1* | 8/2005 | Gaskins ............ | G06F 1/3203 713/322 |
| 2011/0205042 A1* | 8/2011 | Takemura .......... | B60W 30/08 340/435 |
| 2012/0299854 A1* | 11/2012 | Kawai .............. | G06F 3/0488 345/173 |
| 2013/0111241 A1* | 5/2013 | Ha .................. | H04W 52/029 713/322 |
| 2016/0357394 A1* | 12/2016 | Tae ................. | H04W 52/0264 |
| 2017/0117712 A1* | 4/2017 | Cao ................. | G06F 1/28 |
| 2017/0177164 A1 | 6/2017 | Yamamoto et al. | |
| 2018/0107376 A1* | 4/2018 | Howard ............ | G06F 3/04883 |
| 2018/0107650 A1 | 4/2018 | Calvo et al. | |
| 2018/0275819 A1 | 9/2018 | Oshima et al. | |
| 2019/0179529 A1* | 6/2019 | Howard ............ | G06F 3/0236 |

(Continued)

FOREIGN PATENT DOCUMENTS

JP 2010-134876 6/2010

OTHER PUBLICATIONS

Extended European Search Report dated Nov. 30, 2021 in European Patent Application No. 21181991.7, 8 pages.

*Primary Examiner* — Sean T Motsinger
(74) *Attorney, Agent, or Firm* — Xsensus LLP

(57) ABSTRACT

A display apparatus includes circuitry to accept input of handwriting data, perform recognition processing of the handwriting data, and control frequency of the recognition processing in accordance with a power supply state of the display apparatus.

20 Claims, 24 Drawing Sheets

| POWER SUPPLY STATE | FREQUENCY OF RECOGNITION PROCESSING (NUMBER OF STROKES) |
|---|---|
| BATTERY OPERATING STATE (BATCH MODE) | INFINITY NUMBER (USER OPERATION IS REQUIRED) |
| BATTERY CHARGING STATE (REAL-TIME (LOW) MODE) | TEN STROKES (RECOGNITION IS EXECUTED FOR EACH TEN STROKES) |
| AC POWER SUPPLY OPERATING STATE (REAL-TIME (HIGH) MODE) | ONE STROKE (RECOGNITION IS EXECUTED FOR EACH STROKE) |

(56) References Cited

U.S. PATENT DOCUMENTS

2020/0174659 A1\* 6/2020 Howard ................ G06F 3/0412
2020/0183470 A1\* 6/2020 Lee ........................ G06F 9/445
2021/0004265 A1\* 1/2021 Guim Bernat .......... G06F 1/329

\* cited by examiner

| POWER SUPPLY STATE | FREQUENCY OF RECOGNITION PROCESSING (NUMBER OF STROKES) |
|---|---|
| BATTERY OPERATING STATE (BATCH MODE) | INFINITY NUMBER (USER OPERATION IS REQUIRED) |
| BATTERY CHARGING STATE (REAL-TIME (LOW) MODE) | TEN STROKES (RECOGNITION IS EXECUTED FOR EACH TEN STROKES) |
| AC POWER SUPPLY OPERATING STATE (REAL-TIME (HIGH) MODE) | ONE STROKE (RECOGNITION IS EXECUTED FOR EACH STROKE) |

FIG. 21

| EXAMPLES OF HANDWRITING INPUT STORAGE DATA |
|---|
| DataId= "1" Type= "Stroke" PenId= "1" Color= "Black" Width= "1 px" Pattern= "Solid" Angle= "0 dig" StartPoint= "x1,y1" StartTime= "yyyy-mm-ddThh:mm:ss.sss+09:00" EndPoint= "xn,yn" EndTime= "yyyy-mm-ddThh:mm:ss.sss+09:00" Point= "x1,y1,x2,y2,x3,y3,...,yn,yn" Pressure= "p1,p2,p3...pn" |
| DataId= "2" Type= "Stroke" PenId= "1" Color= "Black" Width= "1 px" Pattern= "Solid" Angle= "0 dig" AccountID= "1" StartPoint= "x1,y1" StartTime= "yyyy-mm-ddThh:mm:ss.sss+09:00" EndPoint= "xn,yn" EndTime= "yyyy-mm-ddThh:mm:ss.sss+09:00" Point= "x1,y1,x2,y2,x3,y3,...,yn,yn" Pressure= "p1,p2,p3...pn" |
| DataId= "4" Type= "Text" PenId= "1" Color= "Black" Width= "10 px" Pattern= "Solid" Angle= "180 dig" StartPoint= "x1,y1" StartTime= "yyyy-mm-ddThh:mm:ss.sss+09:00" EndPoint= "xn,yn" EndTime= "yyyy-mm-ddThh:mm:ss.sss+09:00" FontName= "IPA Gothic" FontSize= "50.0 pt" Text= "What you dream" |

801
802
803

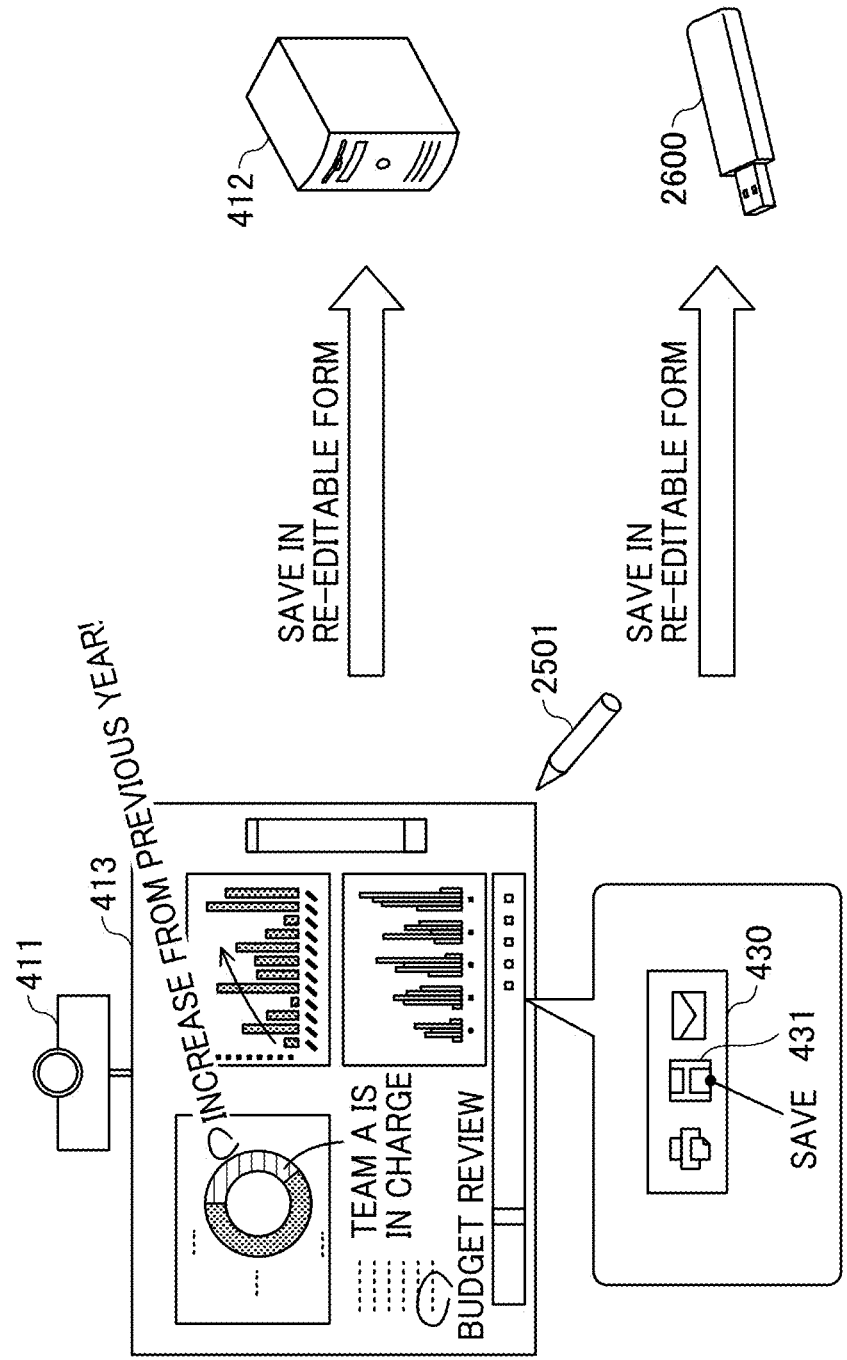

DISPLAY APPARATUS, CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2020-123252, filed on Jul. 17, 2020, in the Japan Patent Office, the entire disclosure of which is hereby incorporated by reference herein.

BACKGROUND

Technical Field

The present disclosure relates to a display apparatus, a control method, and carrier means.

Description of the Related Art

A display apparatus that converts handwriting data into characters or the like using a handwriting recognition technique and displays the characters or the like on a display is known. The display apparatus can be used for, for example, a conference, digital signage, or a signboard. In addition, the display apparatus can be operated with a battery and is expected to be used outdoors.

Techniques for reducing power consumption in various apparatuses have been devised. For example, power consumption of the information processing apparatus in each job or function is automatically measured and stored, and when it is determined that the battery remaining amount is low, the stored power consumption table is used to control the operation of the system.

SUMMARY

A display apparatus according to at least one embodiment of the present disclosure includes circuitry that accepts input of handwriting data, performs recognition processing of the handwriting data, and controls frequency of the recognition processing in accordance with a power supply state of the display apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 21 schematically illustrates stored data stored in a handwriting input storage unit;

FIG. 23 illustrates another configuration example of the display apparatus;

Figure 1:
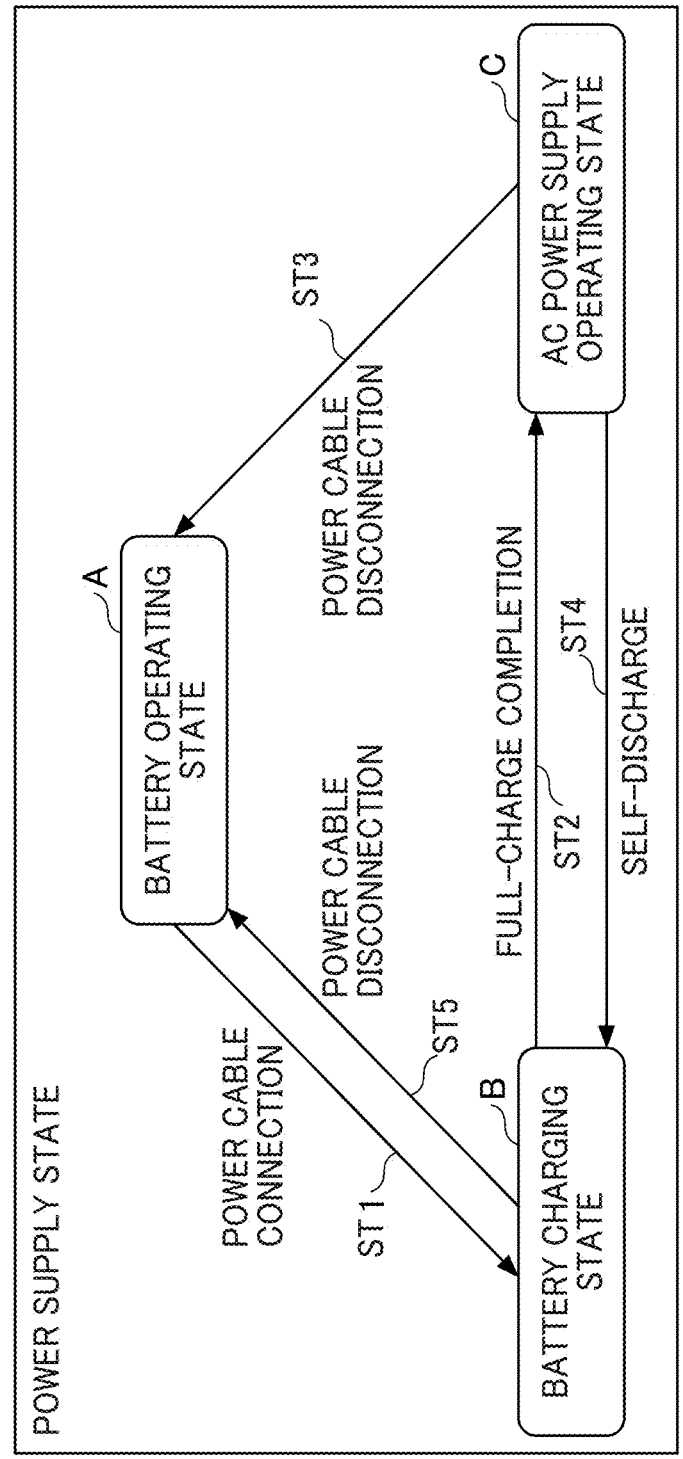
FIG. 1 a diagram illustrating an example of a power supply state of a display apparatus.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In the technique of the related art, there is a drawback that recognition processing of handwriting data is executed regardless of the power supply state. Since the recognition processing is normally executed, the following situations are likely to occur.

A battery with a large capacity is required. The battery operating time decreases. When the battery is used while being charged, the charging time increases.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a display apparatus 2 (see FIG. 3, described later) as an example of an embodiment for implementing the present disclosure and a control method performed by the display apparatus 2 will be described with reference to the drawings.

Outline of Control of Recognition Processing in Accordance with Power Supply State The reason why power consumption increases due to execution of recognition processing on handwriting data will be described. When the display apparatus 2 executes the recognition processing to recognize handwriting data, the power consumption of a central processing unit (CPU) and a random access memory (RAM) (for example, a solid state drive (SSD) or a hard disk drive (HDD)) increases due to the following processing.

The CPU consumes power when performing matching processing of characters and retrieval processing of conversion candidates (search processing).

The RAM (SSD or HDD) consumes power when making an access to a database of matching or conversion candidates, and in a case where electronic paper is used, a display, consumes power when rewriting a screen of the electronic paper. In the case of electronic paper, power consumption is low unless rewriting occurs, which differs from the situation of a liquid crystal display, an organic EL display, or the like.

In the case of the electronic paper, when power consumption increases due to display of conversion candidates and menus, and rewriting of the screen from handwriting data to characters, the following inconvenience may occur.

A power supply or a battery with a large capacity is required. The driving time with the battery decreases. The charging time of the battery increases.

The inconvenience is negligible in a situation where alternating-current (AC) power is available without shortage. However, in outdoor use or the like, the battery driving time is desirably long. In addition, even in indoor use, reduction in power consumption is often required. For example, even when the display apparatus 2 is used indoors in a scene where power supply is limited due to occurrence of a disaster or the like, power consumption is desirably low. Thus, during battery operation or charging, it is desirable to reduce power consumption to increase the driving time and decrease the charging time.

Figure 2:
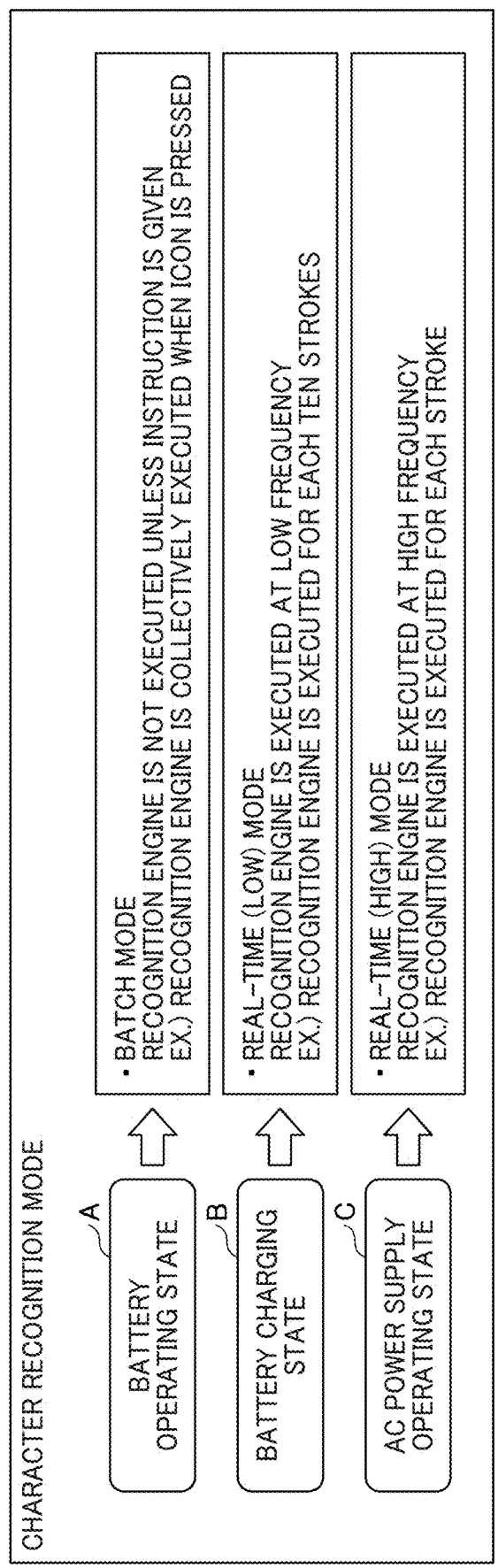
FIG. 2 is a diagram illustrating frequency of recognition processing controlled by the display apparatus in accordance with the power supply state.

Referring to FIGS. 1 and 2, control of frequency of recognition processing in accordance with a power supply state will be described. FIG. 1 illustrates an example of the power supply state of the display apparatus 2. For example, the display apparatus 2 has three power supply states of a battery operating state A, a battery charging state B, and an AC power supply operating state C.

The battery operating state A is a state in which a power supply cable is not connected to the display apparatus 2 and the display apparatus 2 operates only with a battery.

The battery charging state B is a state in which the power supply cable is connected to the display apparatus 2 but the battery is not fully charged. Hence, the AC power is distributed to processing and charging of the display apparatus 2.

The AC power supply operating state C is a state in which the power supply cable is connected to the display apparatus 2 and the battery is fully charged or the remaining power amount is equal to or greater than a threshold value (for example, 90% or more). Hence power is not used for charging and all of the AC power is used for processing of the display apparatus 2.

As illustrated in FIG. 1, each power supply state transitions under the following transition conditions.

ST1. The power supply state transitions from the battery operating state A to the battery charging state B when the power supply cable is connected.

ST2. The power supply state transitions from the "battery charging state B" to the "AC power supply operating state C" when the charging is fully completed.

ST3. The power supply state transitions from the "AC power supply operating state C" to the "battery operating state A" when the power supply cable is disconnected.

ST4. The power supply state transitions from the "AC power supply operating state C" to the "battery charging state B" as a result of self-discharge.

ST5. The power supply state transitions from the "battery charging state B" to the "battery operating state A" when the power supply cable is disconnected.

Alternatively, the "battery operating state A" may be transitioned to the "AC power supply operating state C". This case is that the battery is not necessarily charged automatically in accordance with the battery state.

FIG. 2 illustrates frequency of recognition processing controlled by the display apparatus 2 in accordance with the power supply state. In this embodiment, the frequency of the recognition processing is controlled in three character recognition modes. Thus, the frequency of the recognition processing is controlled in three stages.

A. Battery Operating State

The display apparatus 2 sets the character recognition mode to a batch mode. The display apparatus 2 does not execute the recognition processing unless a user gives an instruction such as when an icon is pressed.

B. Battery Charging State

The display apparatus 2 sets the character recognition mode to a real-time (low) mode. The display apparatus 2 executes the recognition processing at a low frequency, for example, for each ten pieces of stroke data.

C. AC power Supply Operating State

The display apparatus 2 sets the character recognition mode to a real-time (high) mode. The display apparatus 2 executes the recognition processing at a high frequency, for example, for each piece of stroke data.

By controlling (reducing) the frequency at which the recognition processing is executed in accordance with the power supply state, the power consumption can be reduced, the driving time of the battery can be increased, and the charging time can be decreased.

An input unit may be any means capable of designating coordinates on a touch panel and performing handwriting.

Examples of the input unit include a pen, a finger or hand of a person, or a rod-shaped member. A series of operations in which the user presses the input unit against a display, continuously moves the input unit, and then releases the input unit from the display is referred to as a stroke. Stroke data represents information displayed on the display based on the locus of coordinates input by the input unit. The stroke data may be interpolated as appropriate. Data handwritten with a stroke is referred to as stroke data. Handwriting data includes one or more pieces of stroke data. A display object displayed on the display based on the stroke data is referred to as an object.

Character recognition refers to converting handwriting data into character codes. The character recognition can provide conversion into Japanese and multiple languages such as English. The character recognition can further provide conversion into, for example, numerals, symbols (%, $, &, and so forth), and figures (lines, circles, triangles, and so forth).

The power supply state is a state of power supplied to the display apparatus 2. In the present embodiment, the three power supply states of the battery operating state A, the battery charging state B, and the AC power supply operating state C are exemplified. However, other power supply states are also possible. For example, the battery operating state A can be further divided into a plurality of power supply states in accordance with the remaining power amount, and the battery charging state B can be further divided into a plurality of power supply states in accordance with the remaining power amount. In this case, the display apparatus 2 decreases the frequency of the recognition processing as the remaining power amount decreases.

Example of Appearance of Pen

Figure 3:
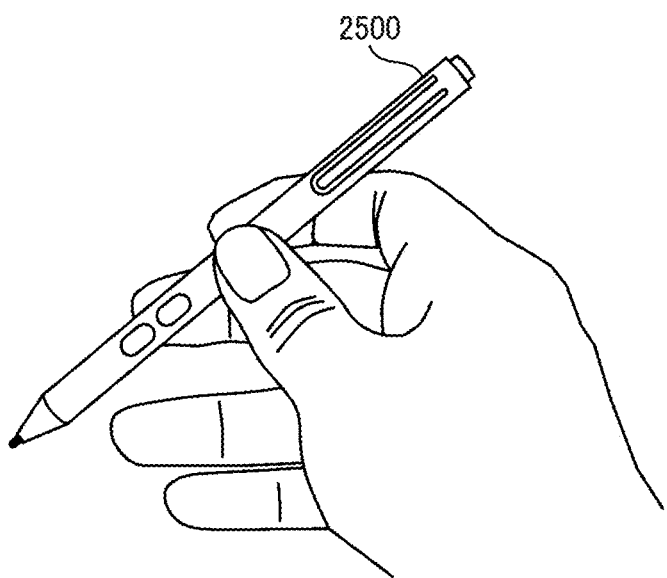
FIG. 3 is a perspective view illustrating an example of a pen.

FIG. 3 is a perspective view illustrating an example of a pen 2500. FIG. 3 illustrates an example of a multifunctional pen 2500. The pen 2500 having a built-in power supply and capable of transmitting an instruction to the display apparatus 2 is referred to as an active pen (a pen having no built-in power supply is referred to as a passive pen). The pen 2500 illustrated in FIG. 3 includes one physical switch provided at the pen tip, one physical switch provided at the pen tail, and two physical switches at the pen side. The physical switch at the pen tip is for writing, the physical switch at the pen tail is for erasing, and the physical switches at the pen side are for implementing functions assigned by a user. The pen 2500 of the present embodiment includes a non-volatile memory, and stores a pen ID that differs from pen IDs of the other pens.

The pen including the switches allows a user to reduce the operation procedure of the display apparatus 2. Although a pen with a switch mainly refers to an active pen, since an electromagnetic induction passive pen not including a built-in power supply can generate power by an LC circuit, examples of the pen with the switch include the electromagnetic induction passive pen in addition to the active pen. Other than the electromagnetic induction passive pen, an optical type pen, an infrared type pen, and a capacitance type pen, each including a switch, is an active pen.

It is assumed that a hardware configuration of the pen 2500 is the same as that of a general-purpose control system including a communication capability and a microcomputer. Examples of an input method of coordinates by the pen 2500 include an electromagnetic induction method and an active electrostatic connecting method. In other example, the pen 2500 further has functions such as pen pressure detection, tilt detection, and a hover function (displaying a cursor before the pen is brought into contact).

General Arrangement of Display Apparatus 2

Figure 4:
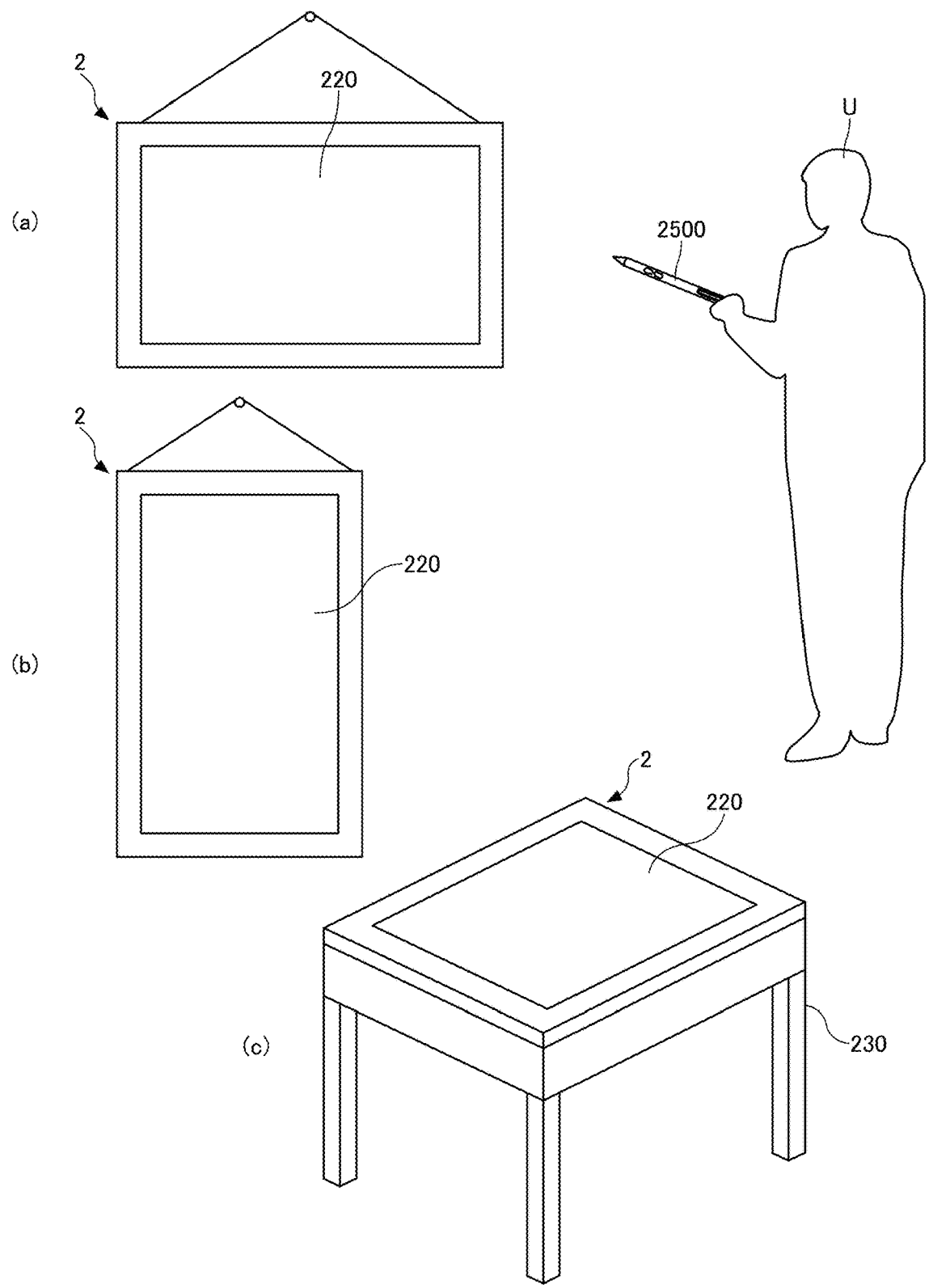
FIG. 4 is a diagram illustrating an example of a general arrangement of the display apparatus.

A general arrangement of the display apparatus 2 according to the present embodiment is described referring to FIG. 4. FIG. 4 is a diagram illustrating a general arrangement of the display apparatus 2. FIG. 4(a) illustrates an example of the display apparatus 2 that is used as a horizontally long electronic whiteboard suspended from a wall.

As illustrated in FIG. 4(a), a display 220 as an example of a display device is installed on the display apparatus 2. A user U can handwrite (also referred to as input or draw) characters or the like on the display 220 using the pen 2500.

FIG. 4(b) illustrates an example of the display apparatus 2 that is used as a vertically long electronic whiteboard suspended from a wall. The display apparatus 2 has an acceleration sensor and can detect the installation direction from the direction of gravity. This enables character recognition regardless of the installation direction.

FIG. 4(c) illustrates the display apparatus 2 placed flat on a desk 230. Since the display apparatus 2 has a thickness of about 1 cm, the height of the desk 230 does not have to be adjusted when the display apparatus 2 is placed flat on the top of the desk 230, which is a general-purpose desk. In addition, the display apparatus 2 can be moved without difficulty.

Hardware Configuration of Display Apparatus 2

Figure 5:
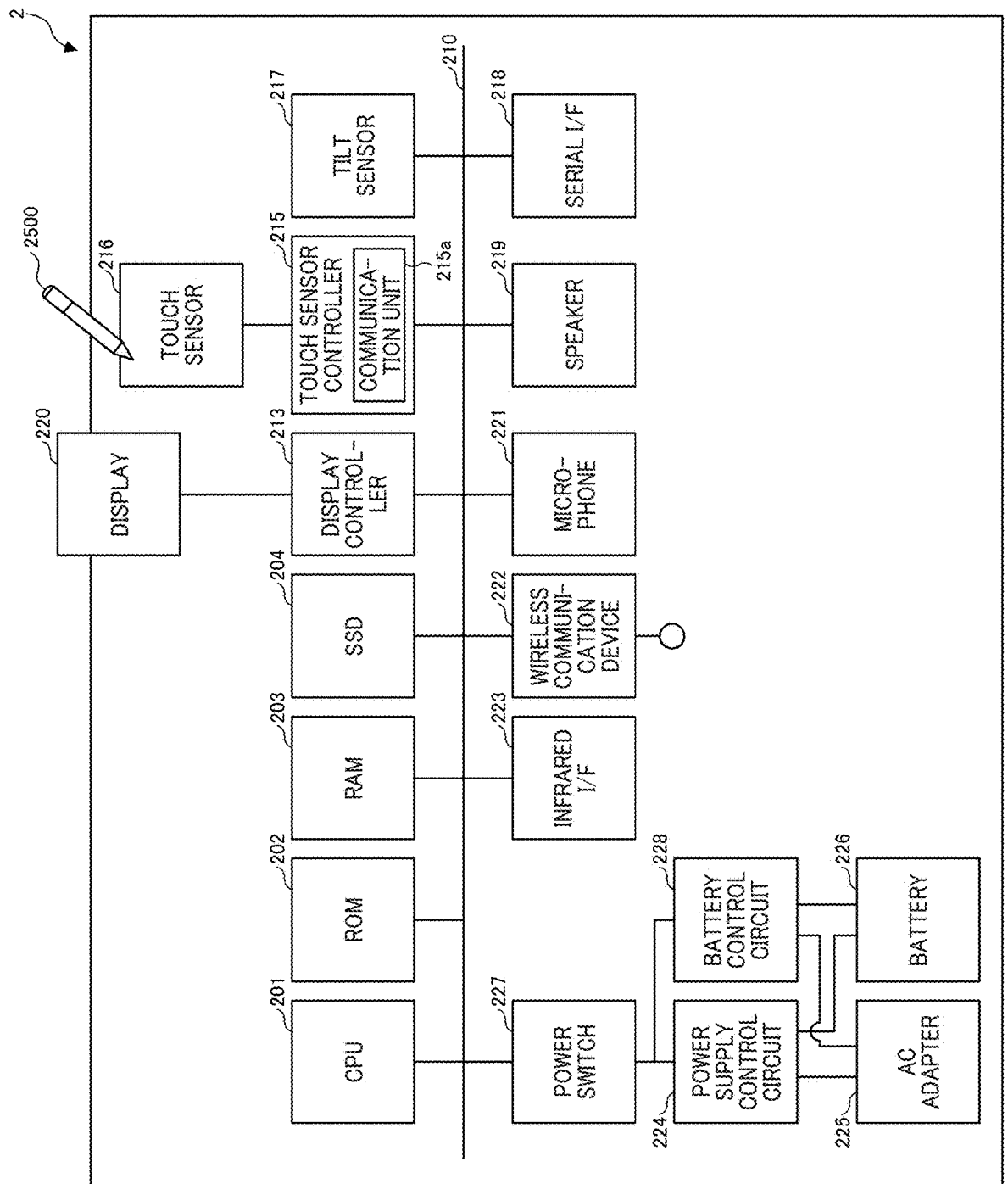
FIG. 5 is a diagram illustrating an example of a hardware configuration of the display apparatus.

A description is given now of a hardware configuration of the display apparatus 2 with reference to FIG. 5. The display apparatus 2 has a configuration of an information processing apparatus or a computer, as illustrated. FIG. 5 is a block diagram illustrating an example of a hardware configuration of the display apparatus 2. As illustrated in FIG. 5, the display apparatus 2 includes a central processing unit (CPU) 201, a read only memory (ROM) 202, a random access memory (RAM) 203, and a solid state drive (SSD) 204.

The CPU 201 controls entire operation of the display apparatus 2. The ROM 202 stores a control program such as an initial program loader (IPL) to boot the CPU 201. The RAM 203 is used as a work area for the CPU 201. The SSD 204 stores various data such as a control program for the display apparatus 2. The program may be downloaded by the display apparatus 2 from a program distribution server or may be installed from a storage medium (carrier means). This program may be called application software.

The display apparatus 2 further includes a display controller 213, a touch sensor controller 215, a touch sensor 216, a display 220, a power switch 227, a tilt sensor 217, a serial interface (I/F) 218, a speaker 219, a microphone 221, a wireless communication device 222, an infrared interface (I/F) 223, a power supply control circuit 224, a battery control circuit 228, an AC adapter 225, and a battery 226.

The display controller 213 controls and manages display of an image for output to the display 220 or another device. The touch sensor 216 detects that the pen 2500, a user's hand, or the like is brought into contact with the display 220. The pen or the user's hand is an example of an input unit. The touch sensor 216 receives the pen ID.

The touch sensor controller 215 controls processing of the touch sensor 216. The touch sensor 216 performs coordinate input and coordinate detection. More specifically, in a case where the touch sensor 216 is optical type, the display 220 is provided with two light receivers/emitters disposed on both upper side ends of the display 220, and a reflector frame surrounding the sides of the display 220. The light receivers/emitters emit a plurality of infrared rays in parallel to a surface of the display 220. Light receiving elements receive rays of light passing in the direction that is the same as an optical path of the emitted infrared rays, which are reflected by the reflector frame. The touch sensor 216 outputs position information of the infrared ray that is blocked by an object after being emitted from the two light receivers/emitters, to the touch sensor controller 215. Based on the position information of the infrared ray, the touch sensor controller 215 detects specific coordinates touched by the object. In addition, the touch sensor controller 215 includes a communication unit 215a that allows the display apparatus 2 to communicate with the pen 2500 wirelessly. For example, when communication is performed in compliance with a standard such as Bluetooth (registered trademark), a commercially available pen can be used. If one or more pens 2500 are registered in the communication unit 215a in advance, the display apparatus 2 and the pen 2500 communicate with each other without the user's manual operation of configuring connection settings between the pen 2500 and the display apparatus 2.

The power switch 227 turns on or off the power of the display apparatus 2. The tilt sensor 217 is a sensor that detects the tilt angle of the display apparatus 2. The tilt sensor 217 is mainly used to detect whether the display apparatus 2 is being used in any of the installation states of FIG. 4(a), FIG. 4(b) or FIG. 4(c). The thickness of characters or the like can be changed automatically based on the detected installation state.

The serial I/F 218 is an interface to connect the display apparatus 2 to extraneous sources such as a Universal Serial Bus (USB). The serial I/F 218 is used to input information from extraneous sources. The speaker 219 is used to output sound, and the microphone 221 is used to input sound. The wireless communication device 222 communicates with a terminal carried by a user and relays the connection to the Internet, for example. The wireless communication device 222 performs communication in compliance with Wi-Fi, Bluetooth (registered trademark), or the like. Any suitable standard can be applied other than the Wi-Fi and Bluetooth (registered trademark). The wireless communication device 222 forms an access point. When a user sets a service set identifier (SSID) and a password that the user obtains in advance in the terminal carried by the user, the terminal is connected to the access point.

It is desirable that two access points are provided for the wireless communication device 222. The two access points include (a) an access point to the Internet, and (b) an access point to an internal network and then to the Internet.

The access point of (a) is for a user outside the company. The user is not able to make an access to the internal network but can use the Internet. The access point of (b) is for a user in the company. The user can use the internal network and the Internet.

The infrared I/F 223 detects another display apparatus 2 disposed adjacently to the own display apparatus 2. The infrared I/F 223 can detect just another display apparatus 2 disposed adjacently to the own display apparatus 2 by using the straightness of infrared rays. It is desirable that one infrared I/F 223 is provided at each side to detect in which direction of the own display apparatus 2 another display apparatus 2 is disposed. This extends the screen. Accordingly, handwritten information or the like that was previously written on the adjacent display apparatus 2 is displayed. In other words, when it is assumed that an area of one display 220 defines one page, handwritten information on another page can be displayed.

The power supply control circuit 224 supplies power from the AC adapter 225 which is a power supply of the display apparatus 2 or the battery 226 to the CPU 201 and the like. The battery control circuit 228 controls charging of the battery 226 which is a power supply of the display apparatus 2. The AC adapter 225 converts an alternating current supplied from a commercial power supply into a direct current. Details will be described referring to FIG. 6. In a case where the display 220 is so-called electronic paper, little or no power is consumed to maintain display of an image. Accordingly, in such a case, the display apparatus 2 can be driven by the battery 226. This makes it possible to use the display apparatus 2 for applications such as digital signage even in places where it is difficult to connect the power supply, such as outdoors.

The display apparatus 2 further includes a bus line 210. The bus line 210 is an address bus, a data bus, or the like, which electrically connects the elements in FIG. 5 such as the CPU 201.

The touch sensor 216 is not limited to the optical type. In another example, the touch sensor 216 is a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display unit. The touch sensor 216 can be of a type that does not require an electronic pen to detect whether the pen tip is in contact with the surface of the display 220. In this case, a finger tip or a pen-shaped stick is used for touch operation. In addition, the pen 2500 can have any suitable shape other than a slim pen shape.

Description of Hardware Related to Power Supply

Figure 6:
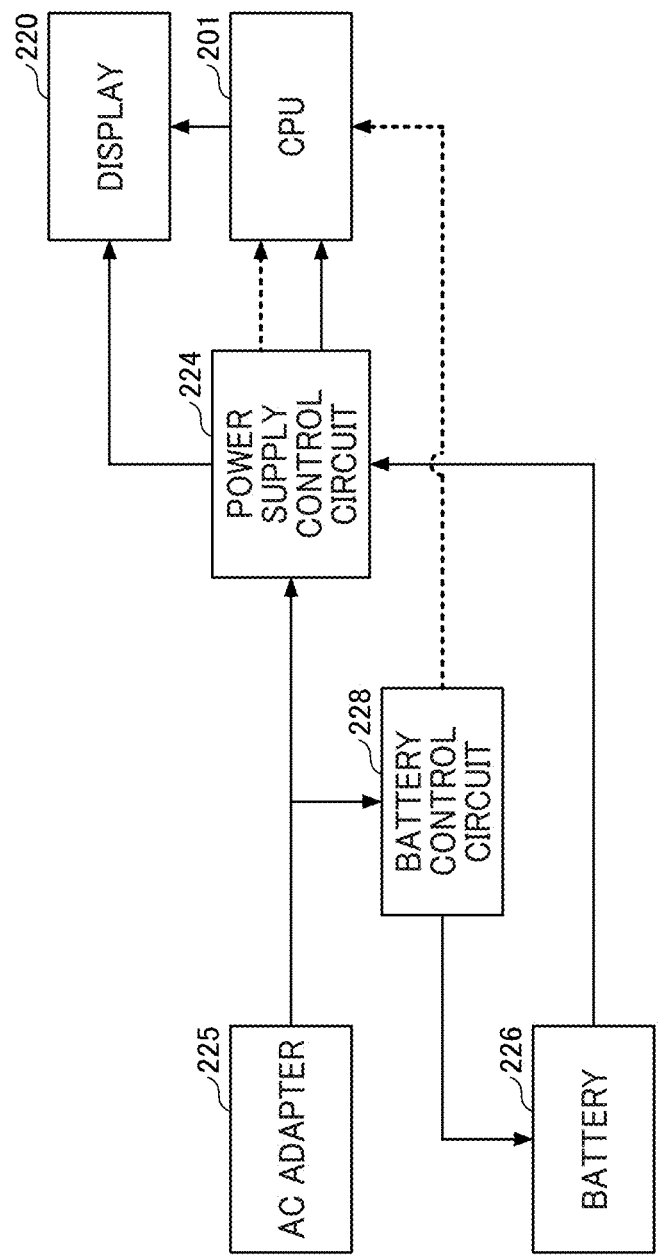
FIG. 6 is a schematic diagram of hardware in which blocks related to a power supply are extracted from FIG. 5.

FIG. 6 is a schematic diagram of hardware in which blocks related to a power supply are extracted from FIG. 5. In FIG. 6, a solid line indicates a flow of power, and a dotted line indicates a flow of information.

The AC adapter 225 and the battery 226 each are connected to the power supply control circuit 224 and the battery control circuit 228. The power supply control circuit 224 supplies power from the AC adapter 225 to the display 220 and the CPU 201. FIG. 6 illustrates merely representative ones among the hardware blocks of FIG. 5, and power is also supplied to other hardware blocks.

The battery control circuit 228 supplies power from the AC adapter 225 to the battery 226 according to the state of charge (SOC) of the battery 226. The power supply control circuit 224 supplies power from the battery 226 to the display 220 and the CPU 201 when the AC adapter 225 is not connected.

The CPU 201 receives the following information from the power supply control circuit 224 and the battery control circuit 228.

The information on the power supply control circuit 224 includes the type of the power supply in use, or more particularly, whether the power supply in use is the AC adapter 225 or the battery 226. The information on the battery controller 33 includes battery information (battery remaining amount, whether or not charging is in progress, charging current, and so forth).

The CPU 201 acquires these pieces of information to determine the power supply state and to control the frequency of the recognition processing of handwriting data in accordance with the power supply state.

Functions of Display Apparatus 2

Figure 7:
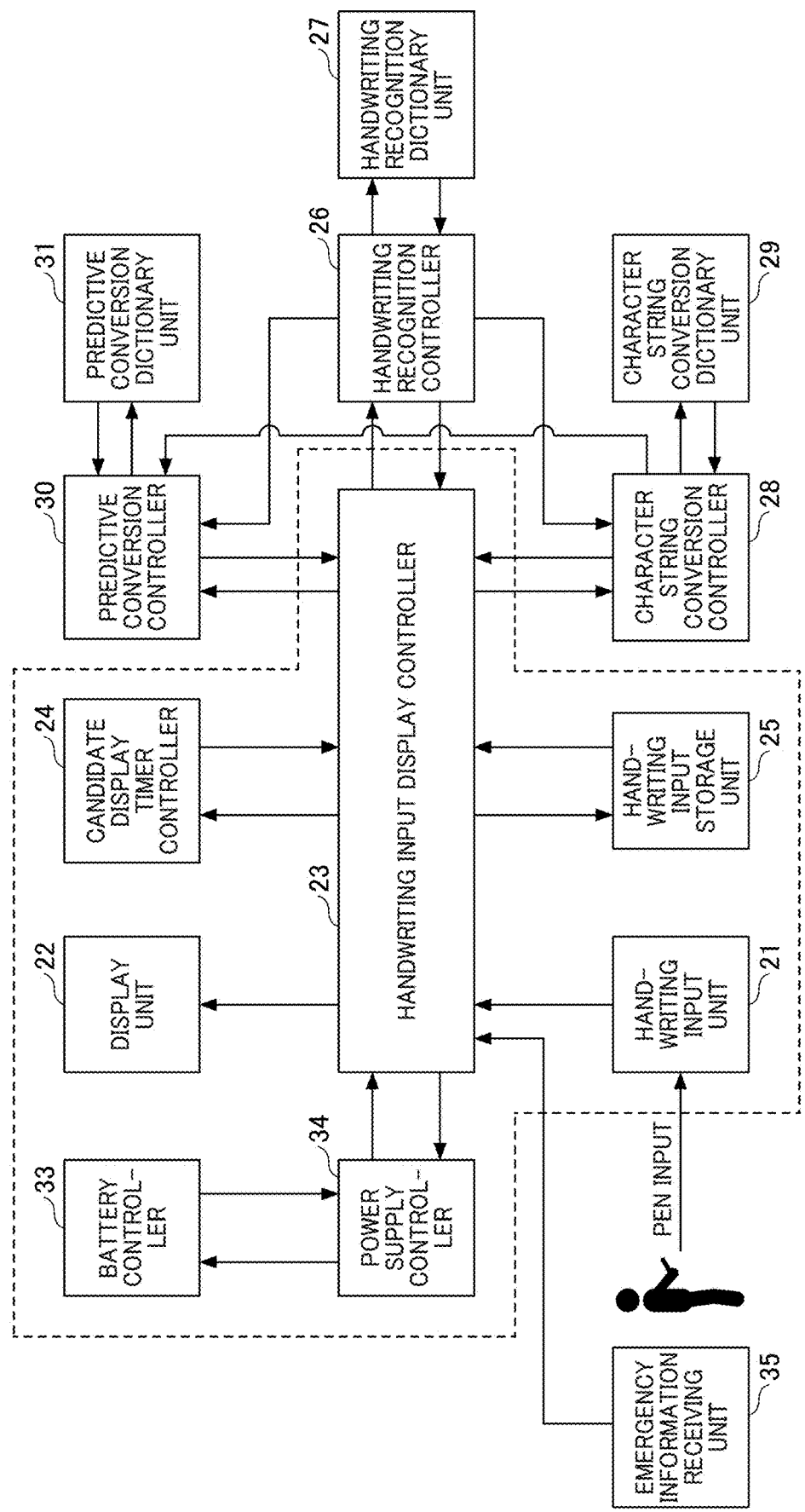
FIG. 7 is a functional block diagram illustrating an example of functions in a block form of the display apparatus.

Next, functions of the display apparatus 2 will be described with reference to FIG. 7. FIG. 7 is a functional block diagram illustrating an example of functions in a block form of the display apparatus 2. The display apparatus 2 includes a handwriting input unit 21, a display unit 22, a handwriting input display controller 23, a candidate display timer controller 24, a handwriting input storage unit 25, a handwriting recognition controller 26, a handwriting recognition dictionary unit 27, a character string conversion controller 28, a character string conversion dictionary unit 29, a predictive conversion controller 30, a predictive conversion dictionary unit 31, a battery controller 33, a power supply controller 34, and an emergency information receiving unit 35. These units included in the display apparatus 2 are functions that are implemented by or means that are caused to function by operating any of the hardware elements illustrated in FIG. 5 in cooperation with the instructions of the CPU 201 according to the control program expanded from the SSD 204 to the RAM 203.

The handwriting input unit 21, which is implemented by, for example, the touch sensor 216, accepts handwriting input. The handwriting input unit 21 converts user's pen input into pen operation data (pen-up, pen-down, or pen coordinate data) with the pen ID, and transmits the pen operation data to the handwriting input display controller 23. Usually, pen coordinate data is periodically transmitted as discrete values, and coordinates between discrete values are complementarily calculated.

The display unit 22 is implemented by the display 220 or the like, and displays handwritten stroke data, a recognized character string, an operation menu, and the like. The display unit 22 converts the drawing data written in the video memory by the handwriting input display controller 23 into data corresponding to the characteristics of the display 220, and transmits the data to the display 220.

The handwriting input display controller 23 performs overall control related to handwriting input and display. The handwriting input display controller 23 processes the pen operation data transmitted from the handwriting input unit 21 and transmits the processed data to cause the display unit 22 to perform display based on the processed data. Details of the processing of the pen operation data and the display of the stroke data will be described later with reference to FIGS. 9 to 14.

The candidate display timer controller 24 is a display control timer for selectable candidates. The candidate display timer controller 24 generates timing for starting or stopping a timer and starting display of selectable candidates and timing for erasing the display. The selectable candidates include a handwriting recognition character string candidate, a language character string candidate, a conversion character string candidate, a character string/predictive conversion candidate, and an operation command candidate, which are selectably displayed in an operation guide described later. The candidate display timer controller 24 receives a timer start request (or a timer stop request) from the handwriting input display controller 23, and transmits a time-out event to the handwriting input display controller 23.

The handwriting input storage unit 25 has a storage function of storing user data (handwriting data/recognized character string). The handwriting input storage unit 25 receives user data from the handwriting input display controller 23, stores the user data in the handwriting input storage unit 25, receives an acquisition request from the handwriting input display controller 23, and transmits the user data stored in the handwriting input storage unit 25.

The handwriting recognition controller 26 is a recognition engine that performs online handwriting recognition (recognition processing of handwriting data). Unlike general optical character reader (OCR), characters (multiple languages such as English in addition to Japanese), numerals, symbols (%, $, &, and so forth), figures (lines, circles, triangles, and so forth) are recognized concurrently with the user's pen operation. Although various algorithms have been proposed for the recognition method, a detailed description is omitted on the assumption that known techniques can be used in the present embodiment.

Further, the handwriting recognition controller 26 receives the pen operation data from the handwriting input display controller 23, executes handwriting recognition, and holds a handwriting recognition character string candidate. Furthermore, the handwriting recognition controller 26 uses the handwriting recognition dictionary unit 27 to convert the handwriting recognition character string candidate into a language character string candidate, and holds the language character string candidate. In response to separately receiving an acquisition request from the handwriting input display controller 23, the handwriting recognition controller 26 transmits the held handwriting recognition character string candidate and the language character string candidate to the handwriting input display controller 23.

The handwriting recognition dictionary unit 27 is dictionary data for language conversion of handwriting recognition. The handwriting recognition dictionary unit 27 receives the handwriting recognition character string candidate from the handwriting recognition controller 26, converts the handwriting recognition character string candidate into a language character string candidate that is linguistically probable, and transmits the language character string candidate to the handwriting recognition controller 26. For example, in the case of Japanese, the handwriting recognition dictionary unit 27 converts hiragana into kanji or katakana.

The character string conversion controller 28 controls the conversion of a conversion character string candidate into a character string. The conversion character string is a character string that is highly likely to be generated including the handwriting recognition character string candidate or the language character string candidate. The character string conversion controller 28 receives the handwriting recognition character string candidate and the language character string candidate from the handwriting recognition controller 26, uses the character string conversion dictionary unit 29 to convert the handwriting recognition character string candidate and the language character string candidate into a conversion character string candidate, and holds the conversion character string candidate. In response to separately receiving an acquisition request from the handwriting input display controller 23, the character string conversion controller 28 transmits the held conversion character string candidate to the handwriting input display controller 23.

The character string conversion dictionary unit 29 is dictionary data for character string conversion. In response to receiving the handwriting recognition character string candidate and the language character string candidate from the character string conversion controller 28, the character string conversion dictionary unit 29 transmits the conversion character string candidate to the character string conversion controller 28.

The predictive conversion controller 30 receives the handwriting recognition character string candidate and the language character string candidate from the handwriting recognition controller 26, and receives the conversion character string candidate from the character string conversion controller 28. The predictive conversion controller 30 uses the predictive conversion dictionary unit 31 to convert each of the handwriting recognition character string candidate, language character string candidate, and conversion character string candidate into a prediction character string candidate. The prediction character string candidate is a character string that is highly likely to be generated including the handwriting recognition character string candidate, the language character string candidate, or the conversion character string candidate. In response to separately receiving an acquisition request from the handwriting input display controller 23, the predictive conversion controller 30 transmits the prediction character string candidate to the handwriting input display controller 23.

The predictive conversion dictionary unit 31 is dictionary data for predictive conversion. In response to receiving the handwriting recognition character string candidate, the language character string candidate, and the conversion character string candidate from the predictive conversion controller 30, the predictive conversion dictionary unit 31 transmits the prediction character string candidate to the predictive conversion controller 30.

The battery controller 33 transmits battery information (battery remaining amount, whether or not charging is in progress, charging current, and so forth) to the power supply controller 34. The power supply controller 34 determines the power supply state from the type of power supply (AC adapter or battery) consumed by the display apparatus 2 and the battery information, and transmits the power supply state to the handwriting input display controller 23.

When the AC adapter 225 is not connected, the power supply state is the battery operating state A.

When the AC adapter 225 is connected and charging is in progress with the battery remaining amount in a range from 0% to 99%, the power supply state is the battery charging state B.

When the AC adapter 225 is connected and charging is not in progress with the battery remaining amount of 100%, the power supply state is the AC power supply operating state C.

The handwriting input display controller 23 determines the frequency of execution of the recognition processing (character recognition mode) based on the power supply state received from the power supply controller 34.

The emergency information receiving unit 35 receives emergency information (information on a demand of reducing power consumption such as a disaster or power failure), for example, from a server that communicates therewith via a network. In response to receiving the emergency information, the emergency information receiving unit 35 informs the handwriting input display controller 23 of that the frequency of the recognition processing is to be decreased. For example, the mode is switched to the batch mode, and the recognition processing is not executed unless there is an instruction from the user.

Relationship Between Power Supply State
(Character Recognition Mode) and Operating
Functional Blocks A correspondence between the functional blocks in FIG. 7 and the character recognition mode is described. Referring to FIG. 7, functional blocks surrounded by dotted lines normally operate regardless of the character recognition mode.

A. Battery Operating State (Batch Mode)

The handwriting input unit 21, the display unit 22, the handwriting input display controller 23, the candidate display timer controller 24, the handwriting input storage unit 25, the battery controller 33, and the power supply controller 34 operate. The handwriting recognition controller 26, the handwriting recognition dictionary unit 27, the character string conversion controller 28, the character string conversion dictionary unit 29, the predictive conversion controller 30, and the predictive conversion dictionary unit 31 do not operate, and hence the driving time can be extended.

B. Battery Charging State

In addition to the functional blocks in the battery operating state A, the remaining functional blocks also operate. However, the frequency of operation is less than that in the AC power supply operating state C. Thus, the charging time can be decreased.

C. AC Power Supply Operating State

In addition to the functional blocks in the battery operating state A, the remaining functional blocks also operate at high frequency without restriction. Thus, the time required for the response in the recognition processing can be decreased.

Display Example of Selectable Candidates

Figure 8:
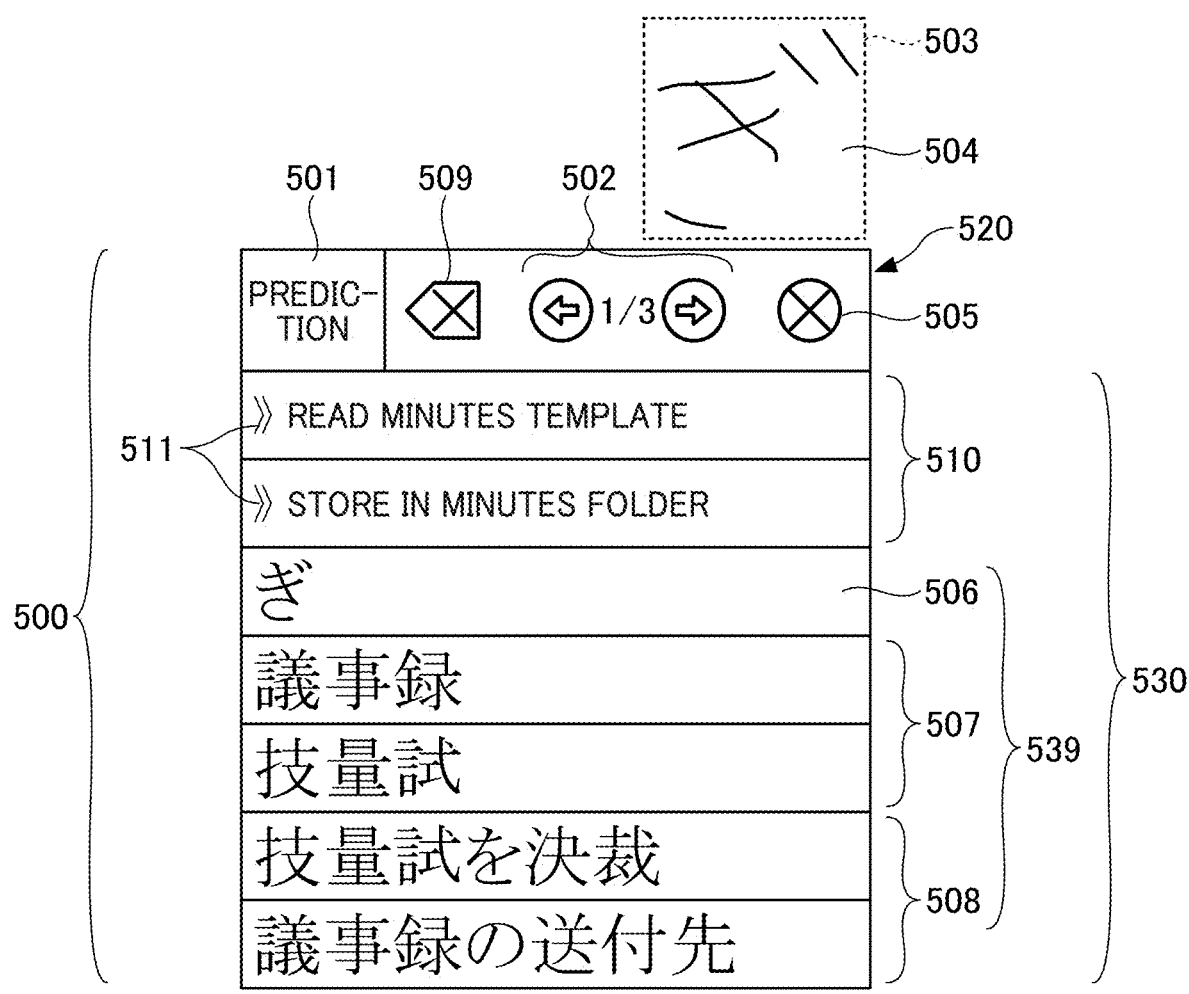
FIG. 8 is a view illustrating an example of an operation guide and selectable candidates displayed by the operation guide.
Figure 9:
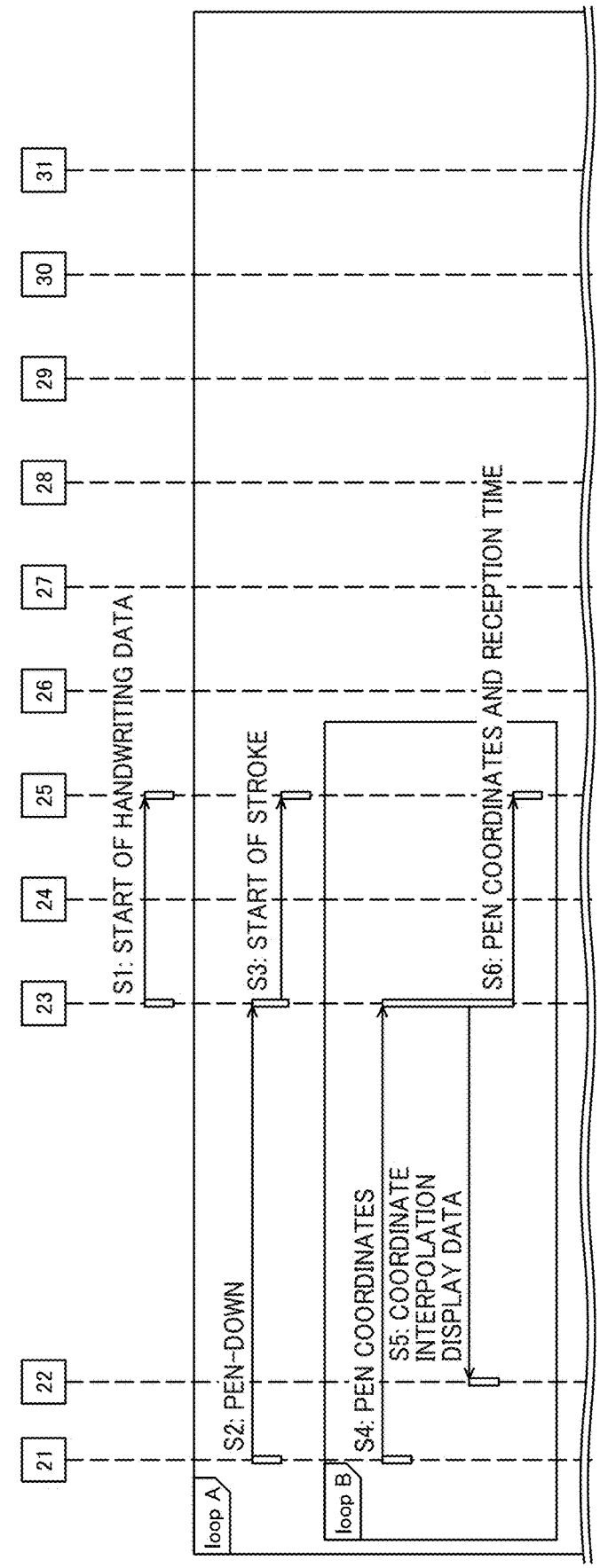
FIG. 9 is a sequence diagram illustrating an example of processing in which the display apparatus displays character string candidates.
Figure 10:
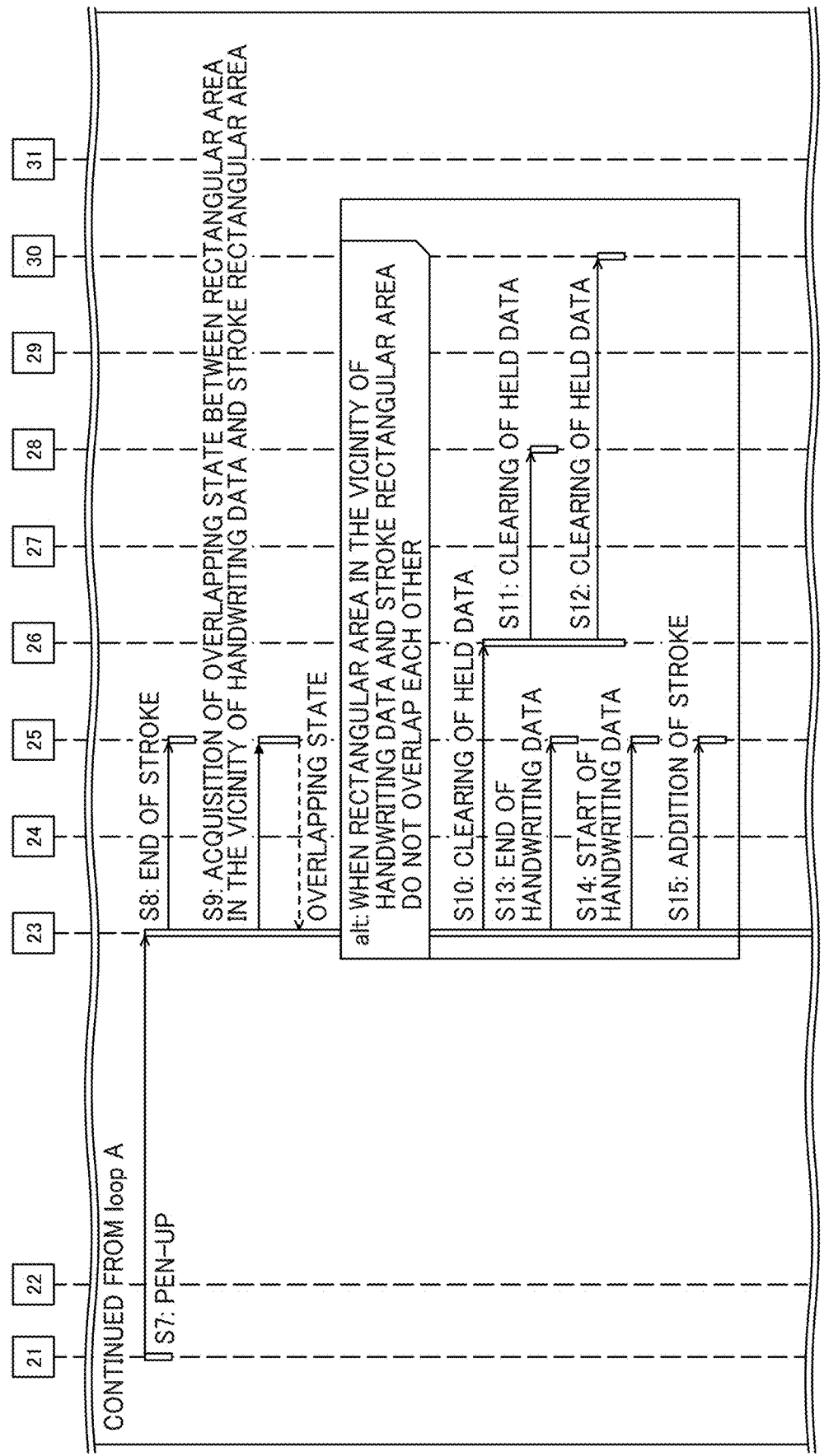
FIG. 10 is a sequence diagram illustrating the example of the processing in which the display apparatus displays the character string candidates.

Next, an operation guide 500 displayed when the handwriting data is converted will be described referring to FIG. 8. FIG. 8 illustrates an example of the operation guide 500 and selectable candidates 530 displayed by the operation guide 500. When the user handwrites handwriting data 504, the operation guide 500 is displayed. The operation guide 500 includes an operation header 520, an operation command candidate 510, a handwriting recognition character string candidate 506, conversion character string candidates 507, character string/predictive conversion candidates 508, and a handwriting data rectangular area display 503. The selectable candidates 530 include the operation command candidate 510, the handwriting recognition character string candidate 506, the conversion character string candidates 507, and the character string/predictive conversion candidates 508. The selectable candidates 530 excluding the operation command candidate 510 are referred to as character string candidates 539.

The operation header 520 has buttons 501, 509, 502, and 505. The button 501 accepts a switching operation between predictive conversion and kana conversion. In the example of FIG. 8, when the user presses the button 501 indicating "prediction", the display unit 22 changes the display to the button 501 indicating "kana". After the change, the character string candidates 539 are listed in descending order of probability of "kana conversion".

The button 502 is a button for page operation of the candidate display. In the example of FIG. 8, there are three candidate display pages, and the first page is currently displayed. The button 505 accepts erasure of the operation guide 500. When the user presses the button 505, the display unit 22 erases the display other than the handwriting data. The button 509 accepts batch display erasure. When the user presses the button 509, the display unit 22 erases all the display illustrated in FIG. 8, including the handwriting data, and allows the user to rewrite the handwriting from the beginning.

The handwriting data 504 is a character "ぎ" (Japanese hiragana character, pronounced as "gi") handwritten by the user. The handwriting data rectangular area display 503 enclosing the handwriting data 504 is displayed. Although the operation guide 500 is displayed by inputting one character in FIG. 8, the timing at which the operation guide 500 is displayed is the timing at which the user stops handwriting. Thus, the number of characters of the handwriting data 504 is any number.

In the handwriting recognition character string candidate 506, the conversion character string candidates 507, and the character string/predictive conversion candidates 508, respective character string candidates are arranged in descending order of probability. A character 5a "ぎ" (Japanese hiragana character, pronounced as "gi") displayed as the handwriting recognition character string candidate 506 is a candidate for the result of handwriting recognition. In this example, the character 5a "ぎ" is recognized correctly.

A character string 5b "議事録" (Japanese kanji characters, meaning "minutes" and pronounced as "gijiroku") and a character string 5c "技量試" displayed as the conversion character string candidates 507 are conversion character string candidates (character compounds) converted from the result of kana-to-kanji conversion of the character 5a "ぎ". For example, the character string 5c "技量試" is a character compound including a kanji "技" and converted from the result of kana-to-kanji conversion of the kanji "技". In this example, the character string 5c "技量試" is an abbreviation of a character string "技術量産試作" (Japanese kanji characters, meaning "technical pre-production" and pronounced as "gijutsu-ryousan-shisaku"). The character string/predictive conversion candidates 508 are prediction character string candidates converted from the conversion character string candidates 507. In this example, a character string 5d "技量試を決済" (Japanese words meaning "settlement of technical pre-production" and pronounced as "giryoushi-wo-kessasi" and a character string 5e "議事録の送付先" (Japanese words meaning "destination of minutes" and pronounced as "gijiroku-no-souhusaki") are displayed as the character string/predictive conversion candidates 508.

The operation command candidates 510 are candidates for predefined operation commands (commands for file operation, character editing, and so forth) displayed in accordance with the recognized characters. In the example of FIG. 8, a line head character ">>" 511 indicates an operation command candidate. In FIG. 8, the character string 5b "議事録" serving as a character string candidate of "ぎ" partially matches the definition data of the operation command, and thus is displayed as an operation command candidate 510.

When the user selects "read minutes template", the operation command defined by the definition data is executed. As described above, since the operation command candidate is displayed when the operation command definition data including the converted character string is found, the operation command candidate is not displayed in some cases.

Although display processing of the operation command is omitted in this embodiment, the display apparatus 2 can display the operation command as illustrated in FIG. 8 by having a dictionary for the operation command.

Operation Procedure of Recognition Processing

Processing of the display apparatus 2 recognizing handwriting data will be described with reference to the above configuration and FIGS. 9 to 14. FIGS. 9 to 14 are sequence diagrams illustrating an example of processing in which the display apparatus 2 displays character string candidates. The processing of FIG. 9 starts when the display apparatus 2 is activated (when an application is activated). Referring to FIGS. 9 to 14, recognition processing in the AC power supply operating state C will be described. FIGS. 9 to 14 illustrate the functions illustrated in FIG. 7 in the form of reference signs due to the limitation of space.

S1: The handwriting input display controller 23 transmits start of handwriting data to the handwriting input storage unit 25. The handwriting input storage unit 25 secures a handwriting data area (memory area for storing handwriting data). Alternatively, the handwriting data area may be secured after the user brings the pen into contact with the handwriting input unit 21.

S2: The user brings the pen into contact with the handwriting input unit 21. The handwriting input unit 21 detects pen-down and transmits the pen-down to the handwriting input display controller 23.

S3: The handwriting input display controller 23 transmits start of a stroke to the handwriting input storage unit 25, and the handwriting input storage unit 25 secures a stroke area.

S4: When the user moves the pen while keeping the pen in contact with the handwriting input unit 21, the handwriting input unit 21 transmits pen coordinates to the handwriting input display controller 23.

S5: The handwriting input display controller 23 transmits pen coordinate interpolation display data (data for interpolating discrete pen coordinates) to the display unit 22. The display unit 22 interpolates pen coordinates by using the pen coordinate interpolation display data to display a line.

S6: The handwriting input display controller 23 transmits the pen coordinates and the reception time thereof to the handwriting input storage unit 25. The handwriting input storage unit 25 adds the pen coordinates to the stroke data. While the user moves the pen, the handwriting input unit 21 periodically repeats transmission of the pen coordinates to the handwriting input display controller 23, and thus the processing of steps S4 to S6 is repeated until the pen is moved up (pen-up).

S7: When the user separates the pen from the handwriting input unit 21, the handwriting input unit 21 transmits pen-up to the handwriting input display controller 23.

S8: The handwriting input display controller 23 transmits end of the stroke to the handwriting input storage unit 25. The handwriting input storage unit 25 determines the pen coordinates of the stroke data. After the pen coordinates of the stroke data are determined, pen coordinates are no longer added to the stroke data.

S9: The handwriting input display controller 23 transmits a request for acquisition of an overlapping state between a rectangular area (circumscribed rectangle) in the vicinity of the handwriting data and a stroke rectangular area to the handwriting input storage unit 25 based on the rectangular area in the vicinity of the handwriting data already handwritten. The handwriting input storage unit 25 calculates an overlapping state and transmits the overlapping state to the handwriting input display controller 23.

The following steps S10 to S15 are executed when the rectangular area in the vicinity of the handwriting data and the stroke rectangular area do not overlap each other.

S10: When the rectangular area in the vicinity of the handwriting data and the stroke rectangular area do not overlap each other, one piece of handwriting data is determined, and thus the handwriting input display controller 23 transmits a request for clearing of held data to the handwriting recognition controller 26.

S11, S12: The handwriting recognition controller 26 transmits the clearing of the held data to the character string conversion controller 28 and the predictive conversion controller 30. The handwriting recognition controller 26, the character string conversion controller 28, and the predictive conversion controller 30 clear the data related to the character string candidates and the operation command candidates held until then. At the time of the clearing, the stroke data handwritten last is not added to the handwriting data.

S13: The handwriting input display controller 23 transmits end of the handwriting data to the handwriting input storage unit 25. The handwriting input storage unit 25 determines handwriting data. The determination of handwriting data represents that one piece of handwriting data is completed (stroke data is no longer added).

S14: The handwriting input display controller 23 transmits start of handwriting data to the handwriting input storage unit 25. In preparation for the start (pen-down) of handwriting of the next handwriting data, the handwriting input storage unit 25 secures a new handwriting data area.

S15: The handwriting input display controller 23 transmits addition of a stroke for the stroke data ended in step S8 to the handwriting input storage unit 25. When steps S10 to S15 have been executed, stroke data to be added is first stroke data of handwriting data, and the handwriting input storage unit 25 adds stroke data to the handwriting data that is being started. When steps S10 to S15 have not been executed, stroke data to be added is added to the handwriting data that is already being handwritten.

S16: The handwriting input display controller 23 transmits the addition of the stroke to the handwriting recognition controller 26. The handwriting recognition controller 26 adds the stroke data to a stroke data holding area (an area in which stroke data is temporarily stored) in which a character string candidate is stored.

S17: The handwriting recognition controller 26 executes handwriting recognition on the stroke data. As described above, in the AC power supply operating state C, the recognition processing is executed for each piece of stroke data.

S18: The handwriting recognition controller 26 transmits a handwriting recognition character string candidate, which is one of the execution results of the recognition processing, to the handwriting recognition dictionary unit 27. The handwriting recognition dictionary unit 27 transmits a language character string candidate that is linguistically probable to the handwriting recognition controller 26.

S19: The handwriting recognition controller 26 transmits the handwriting recognition character string candidate and the received language character string candidate to the character string conversion controller 28.

S20: The character string conversion controller 28 transmits the handwriting recognition character string candidate and the language character string candidate to the character string conversion dictionary unit 29. The character string conversion dictionary unit 29 transmits a conversion character string candidate to the character string conversion controller 28.

S21: The character string conversion controller 28 transmits the received conversion character string candidate to the predictive conversion controller 30.

S22: The predictive conversion controller 30 transmits the received conversion character string candidate to the predictive conversion dictionary unit 31. The predictive conversion dictionary unit 31 transmits a prediction character string candidate to the predictive conversion controller 30.

S23: The handwriting recognition controller 26 transmits the handwriting recognition character string candidate and the language character string candidate to the predictive conversion controller 30.

S24: The predictive conversion controller 30 transmits the handwriting recognition character string candidate and the received language character string candidate to the predictive conversion dictionary unit 31. The predictive conversion dictionary unit 31 transmits a prediction character string candidate to the predictive conversion controller 30.

As described above, candidates up to a prediction character string candidate are created from a piece of stroke data. The display apparatus 2 repeats the same processing each time the stroke data increases. Thus, power consumption tends to increase.

The handwriting recognition controller 26 holds data related to the handwriting recognition character string candidate and the language character string candidate, the character string conversion controller 28 holds data related to the conversion character string candidate, and the predictive conversion controller 30 holds data related to the prediction character string candidate so that the handwriting input display controller 23 can acquire the data in subsequent steps S29 to S31.

S16-2: The handwriting input display controller 23 transmits start of a selectable candidate display timer to the candidate display timer controller 24 immediately after transmitting the addition of the stroke to the handwriting recognition controller 26 in step S16. The candidate display timer controller 24 starts the selectable candidate display timer.

Subsequent steps S25 to S27 are executed when pen-down occurs before a predetermined time elapses (before the timer times out). That is, this is a case where the user continues handwriting.

S25: When the user brings the pen into contact with the handwriting input unit 21 before the selectable candidate display timer times out, the handwriting input unit 21 transmits the pen-down (the same event as step S2) to the handwriting input display controller 23.

S26: The handwriting input display controller 23 transmits start of a stroke (the same as step S3) to the handwriting input storage unit 25. The subsequent sequence is the same as that in and after step S3.

S27: The handwriting input display controller 23 transmits stop of the selectable candidate display timer to the candidate display timer controller 24. The candidate display timer controller 24 stops the selectable candidate display timer. This is because the pen-down is detected and the selectable candidate display timer is no longer required.

Steps S28 to S53 are executed when pen-down does not occur before a predetermined time elapses (before the selectable candidate display timer times out). Thus, the operation guide 500 illustrated in FIG. 8 is displayed.

S28: When the user does not bring the pen into contact with the handwriting input unit 21 while the selectable candidate display timer is started, the candidate display timer controller 24 transmits time-out to the handwriting input display controller 23.

S29: The handwriting input display controller 23 transmits acquisition of a handwriting recognition character string candidate and a language character string candidate to the handwriting recognition controller 26. The handwriting recognition controller 26 transmits the currently held handwriting recognition character string candidate and language character string candidate to the handwriting input display controller 23.

S30: The handwriting input display controller 23 transmits acquisition of a conversion character string candidate to the character string conversion controller 28. The character string conversion controller 28 transmits the currently held conversion character string candidate to the handwriting input display controller 23.

S31: The handwriting input display controller 23 transmits acquisition of a prediction character string candidate to the predictive conversion controller 30. The predictive conversion controller 30 transmits the currently held prediction character string candidate to the handwriting input display controller 23.

S32: The handwriting input display controller 23 transmits acquisition of an estimated writing direction to the handwriting input storage unit 25. The handwriting input storage unit 25 determines the estimated writing direction from the horizontal distance and vertical distance of the handwriting data rectangular area, and transmits the estimated writing direction (vertical writing or horizontal writing) to the handwriting input display controller 23.

S33: The handwriting input display controller 23 creates selectable candidate display data as illustrated in FIG. 8 from the handwriting recognition character string candidate (the character 5*a* " ぎ " in FIG. 8), the language character string candidates (although not illustrated in FIG. 8, for example, a character " 議 " and a character " 技 ", both being Japanese kanji characters pronounced as "gi"), the conversion character string candidates (the character string 5*b* " 議事録 " and the character string 5*c* " 技量試 " in FIG. 8), the prediction character string candidates (the character string 5*d* " 技量試を決済 " and the character string 5*e* " 議事録 " in FIG. 8), the operation command candidates ("read minutes template" and "store in minutes folder" in FIG. 8), each selection probability, and the estimated writing direction. The handwriting input display controller 23 transmits the selectable candidate display data to the display unit 22 to display the selectable candidate display data.

S34: The handwriting input display controller 23 transmits rectangular area display data (rectangular frame) of the handwriting data (handwriting data rectangular area display 503 in FIG. 8) to the display unit 22 to display the rectangular area display data.

S35: The handwriting input display controller 23 transmits start of a selectable candidate erasure timer to the candidate display timer controller 24 in order to erase the selectable candidate display after a predetermined time elapses since the display of the selectable candidate display data. The candidate display timer controller 24 starts the selectable candidate erasure timer.

Steps S36 to S40 are executed when the user has erased the selectable candidate display displayed on the display unit 22 while the selectable candidate erasure timer is started, when a change in the handwriting data has occurred (that is, when stroke data of handwriting data has been added, erased, moved, modified, or divided), or when no candidate has been selected by time-out.

Steps S36 and S37 are executed when the candidate display is erased.

S36: The handwriting input unit 21 transmits erasure of a selectable candidate to the handwriting input display controller 23.

S37: The handwriting input display controller 23 transmits stop of the selectable candidate erasure timer. The candidate display timer controller 24 stops the selectable candidate erasure timer. This is because the user has erased the selectable candidate and the selectable candidate erasure timer is no longer required.

S39: The handwriting input display controller 23 transmits erasure of the selectable candidate display data to the display unit 22 to erase the display.

S40: The handwriting input display controller 23 transmits erasure of the rectangular area display data of the handwriting data to the display unit 22 to erase the display. Thus, the display of the handwriting data is maintained as it is.

S38: In contrast, when erasure of the selectable candidate does not occur while the selectable candidate erasure timer is started (when the user does not perform the pen operation), the candidate display timer controller 24 transmits time-out to the handwriting input display controller 23.

After the time-out of the selectable candidate erasure timer, the handwriting input display controller 23 similarly executes steps S39 and S40. This is because the selectable candidate display data and the rectangular area display data of the handwriting data may be erased after a certain time elapses.

If the user selects a selectable candidate while the selectable candidate erasure timer is started, steps S41 to S53 are executed.

S41: When the user selects a selectable candidate while the selectable candidate erasure timer is started, the handwriting input unit 21 transmits selection of a character string candidate or an operation command candidate to the handwriting input display controller 23.

S42: The handwriting input display controller 23 transmits stop of the selectable candidate erasure timer to the candidate display timer controller 24. The candidate display timer controller 24 stops the selectable candidate erasure timer.

S43: The handwriting input display controller 23 transmits clearing of held data to the handwriting recognition controller 26.

S44: The handwriting recognition controller 26 transmits the clearing of the held data to the character string conversion controller 28.

S45: The handwriting recognition controller 26 transmits the clearing of the held data to the predictive conversion controller 30.

The handwriting recognition controller 26, the character string conversion controller 28, and the predictive conversion controller 30 clear the data related to the character string candidate held until then.

S46: The handwriting input display controller 23 transmits erasure of the selectable candidate display data to the display unit 22 to erase the display.

S47: The handwriting input display controller 23 transmits erasure of the rectangular area display data of the handwriting data to the display unit 22 to erase the display.

S48: The handwriting input display controller 23 transmits erasure of the handwriting data display data and erasure of the pen coordinate complementary display data transmitted in step S5 to the display unit 22 to erase the display. This is because the character string candidate or the operation command candidate is selected and the handwriting data and so forth is no longer required.

S49: The handwriting input display controller 23 transmits erasure of the handwriting data to the handwriting input storage unit 25. This is because the recognition result is displayed and the handwritten stroke data is no longer required.

S50: When a character string candidate is selected, the handwriting input display controller 23 transmits addition of the character string obtained through recognition (selected by the user) to the handwriting input storage unit 25.

S51: The handwriting input display controller 23 transmits acquisition of character string data font to the handwriting input storage unit 25. The handwriting input storage unit 25 selects a defined font from the estimated character size of the handwriting data and transmits the selected defined font to the handwriting input display controller 23.

S52: The handwriting input display controller 23 uses the defined font received from the handwriting input storage unit 25 to transmit character string data display data which causes the character string data to be displayed at the same position as the position of the handwriting data, to the display unit 22.

S53: The handwriting input display controller 23 transmits start of handwriting data to the handwriting input storage unit 25 for the next handwriting data. The handwriting input storage unit 25 secures a handwriting data area. Thereafter, steps S2 to S53 are repeated.

Outline of Recognition Processing

Figure 15:
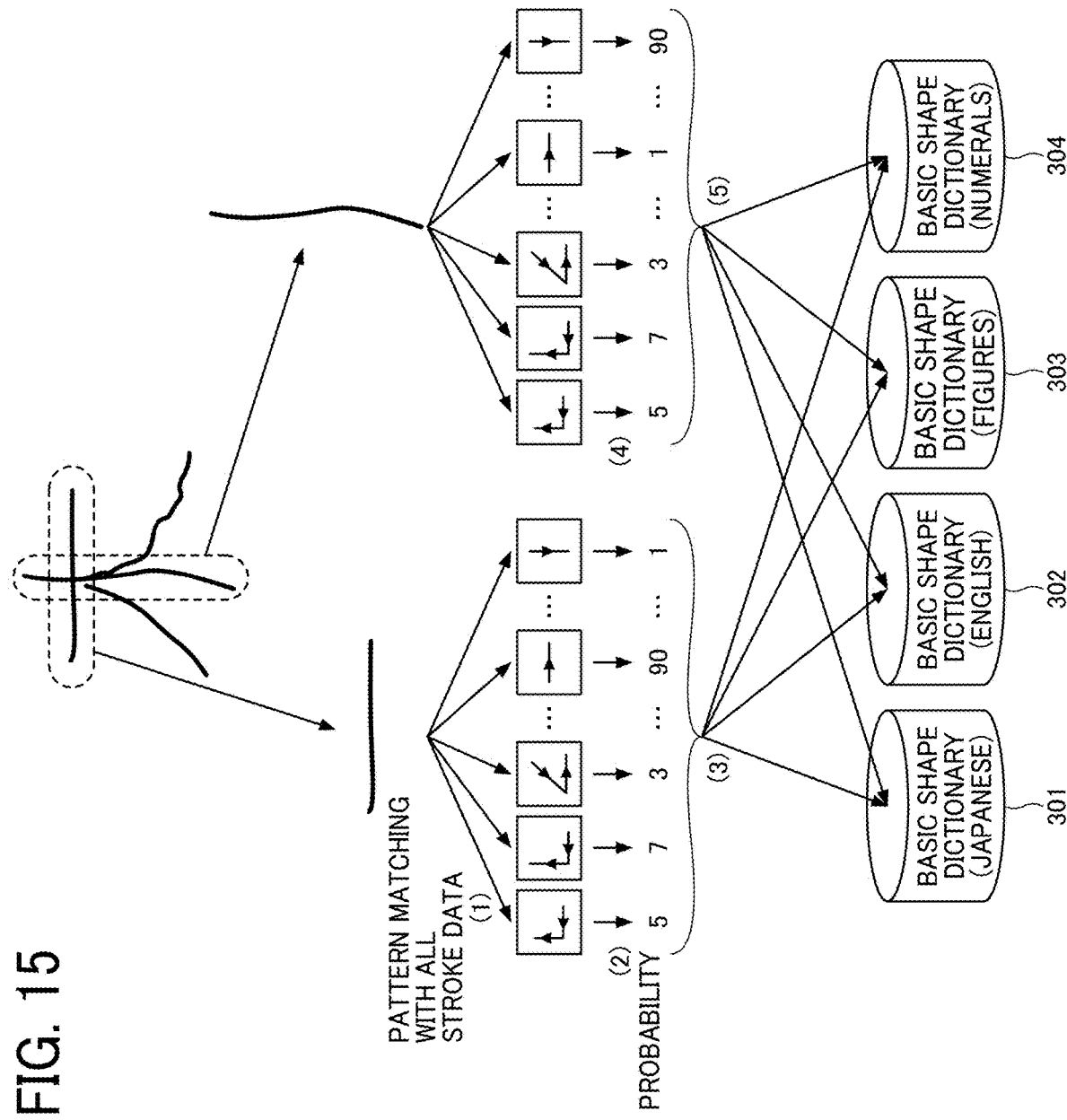
FIG. 15 is a diagram illustrating an outline of processing in which a handwriting recognition controller recognizes a character.

Next, an outline of recognition processing will be described referring to FIG. 15. FIG. 15 is a diagram illustrating an outline of processing in which the handwriting recognition controller 26 recognizes a character. In FIG. 15, a case of recognizing a character 5f "木" (Japanese kanji character meaning "tree" and pronounced as "ki") will be described.

(1) The user handwrites stroke data of the first stroke of the character 5f "木". The handwriting recognition controller 26 pattern-matches the stroke data of the first stroke with a basic stroke whose shape is previously defined. The pattern matching refers to a method of identifying whether or not a specific pattern appears and where the specific pattern appears when data is searched, or a method of comparing and recognizing handwritten characters, graphics, voice, and the like with a large number of standard patterns registered in advance based on characteristics of information. The pattern matching is also referred to as pattern recognition.

The basic stroke is obtained by extracting stroke data included in hiragana, katakana, kanji, numerals, alphabets, and figures one by one and abstracting and commonizing them to some extent. In other words, all characters and the like are composed of basic strokes. The basic stroke is identified as one of Japanese, English, a figure, and a numeral.

(2) The handwriting recognition controller 26 performs pattern matching between the stroke data of the first stroke data and all basic strokes, and calculates the probability representing the degree of similarity for each of the basic strokes. Basic strokes having more similar shapes are calculated with higher probabilities.

(3) Then, the handwriting recognition controller 26 searches basic shape dictionaries 301 to 304 with a number N of basic strokes having higher probabilities. That is, a character that is completed with the first stroke, a character including the first stroke, or the like is acquired from the basic shape dictionaries 301 to 304. The basic shape dictionaries 301 to 304 are divided into the dictionary for Japanese, the dictionary for English, the dictionary for figures, and the dictionary for numerals, and candidates can be searched from each of the dictionaries. For example, a character "一" (Japanese kanji character meaning "one" and pronounced as "ichi") and "-" (horizontal line), and the like match the search.

(4) The handwriting recognition controller 26 performs the same processing for the second stroke. Thus, the probability between the second stroke and each basic stroke is calculated. Since the number of characters corresponding to plural pieces of stroke data varies depending on the handwritten content, the handwriting recognition controller 26 recognizes the stroke data by dividing the stroke data into one character by a blank, or uses the basic shape dictionaries 301 to 304 corresponding to a plurality of characters.

(5) The handwriting recognition controller 26 generates N×N characters by combining N higher-order basic strokes in the first stroke and N higher-order basic strokes in the second stroke. When N is 2, 2×2=4 characters are generated. The handwriting recognition controller 26 searches the basic shape dictionaries 301 to 304 using these characters. That is, a character that is completed with the first stroke and the second stroke, a character including the first stroke and the second stroke, or the like is acquired from the basic shape dictionaries 301 to 304. For example, a character "+" (Japanese kanji character meaning "ten" and pronounced as "ju") and a character "ナ" (Japanese katakana character pronounced as "na") match the search.

As described above, the handwriting recognition controller 26 can execute the recognition processing for each piece of stroke data, and can immediately display the character string candidate when the user performs pen-up and the selectable candidate display timer times out (S28).

Frequency of Execution of Recognition Processing in Each Power Supply State

As described with reference to the sequence diagrams of FIGS. 9 to 14, when the handwriting input display controller 23 adds stroke data to the handwriting recognition controller 26, the handwriting recognition controller 26 starts recognition processing. Hence, in order to control the frequency of the recognition processing, the handwriting input display controller 23 may control the frequency of adding stroke data to the handwriting recognition controller 26. Thus, the handwriting input display controller 23 has a frequency control table as presented in FIG. 16.

Figures 16, 17:
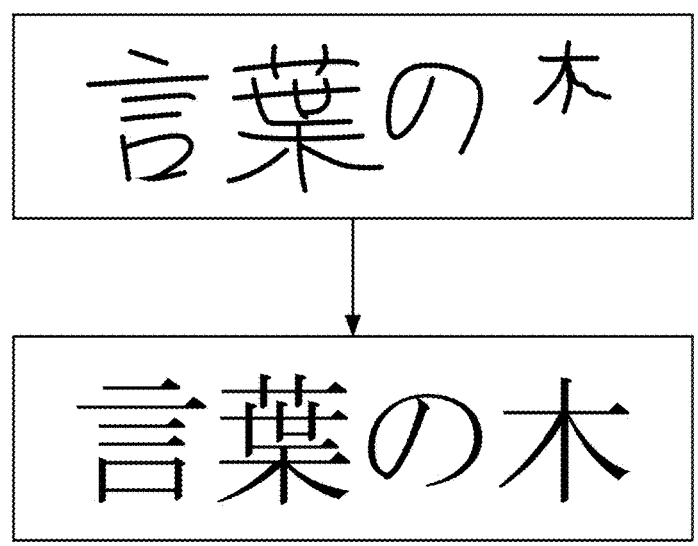
FIG. 16 is a table presenting an example of a frequency control table.
FIG. 17 is a diagram presenting processing when part of one character is recognized.

FIG. 16 presents an example of a frequency control table. In the frequency control table, the frequency of the recognition processing is associated with the power supply state. The frequency of the recognition processing is represented by the number of strokes. For example, the battery operating state A is associated with an infinite number of strokes. This indicates that the recognition processing is not executed unless a user operation such as pressing of an icon is input. The battery charging state B is associated with the number of strokes "10". The AC power supply operating state C is associated with the number of strokes "1".

The handwriting input display controller 23 counts the number of pieces of stroke data added to the handwriting input storage unit 25, refers to the frequency control table, and adds a predetermined number (two or more) of pieces of stroke data determined by the frequency control table to the handwriting input storage unit 25, and then requests the handwriting recognition controller 26 to perform the recognition processing. Note that the number "ten" is an example, and is set as appropriate. The user may set a desired number of strokes.

The handwriting recognition controller 26 executes the recognition processing, for example, for each ten pieces of stroke data. The number of characters corresponding to the stroke data for ten strokes varies depending on the handwritten content, but in the case of Japanese and English print, there is a blank for each character, and the characters are divided for each character. In the case of English script, recognition is performed, for example, in units of words.

However, even though the stroke data does not reach the stroke data for ten strokes, the handwriting recognition controller 26 performs recognition processing on the stroke data in response to time-out of the selectable candidate display timer. This is because when the selectable candidate display timer times out, it is considered that the user finishes handwriting and wants to display the character string candidate 539. Thus, in the case of the battery charging state B, when the stroke data for "ten strokes" is handwritten, or when the selectable candidate display timer times out, the handwriting input display controller 23 requests the handwriting recognition controller 26 to perform the recognition processing.

The handwriting recognition controller 26 performs the processing described with reference to FIG. 15 on one or more pieces of stroke data divided into one character among the stroke data for ten strokes. In this case, it is not required to search the basic shape dictionaries 301 to 304 for each piece of stroke data, and the basic shape dictionaries 301 to 304 may be searched for a character generated by combining pieces of stroke data for one character. This means that power consumption can be reduced by performing recognition processing on the stroke data for ten strokes.

In this case, the recognition processing may be performed on part of one character. For example, as illustrated in FIG. 17, the recognition processing may be executed in a state in which the user has tried to handwrite a character string "言葉の森" (Japanese words meaning "forest of words" and pronounced as "kotoba-no-mori") but has handwritten the character string to the middle of a character "森". In this case, the handwriting recognition controller 26 recognizes the character string as a character string "言葉の木" (Japanese words meaning "tree of words" and pronounced as "kotoba-no-ki"), but since the user continues handwriting, the selectable candidate display timer does not time out, and thus the character string "言葉の木" is not displayed. The display is provided when the user finishes writing up to the character string "言葉の森" and the selectable candidate display timer times out.

Figure 18:
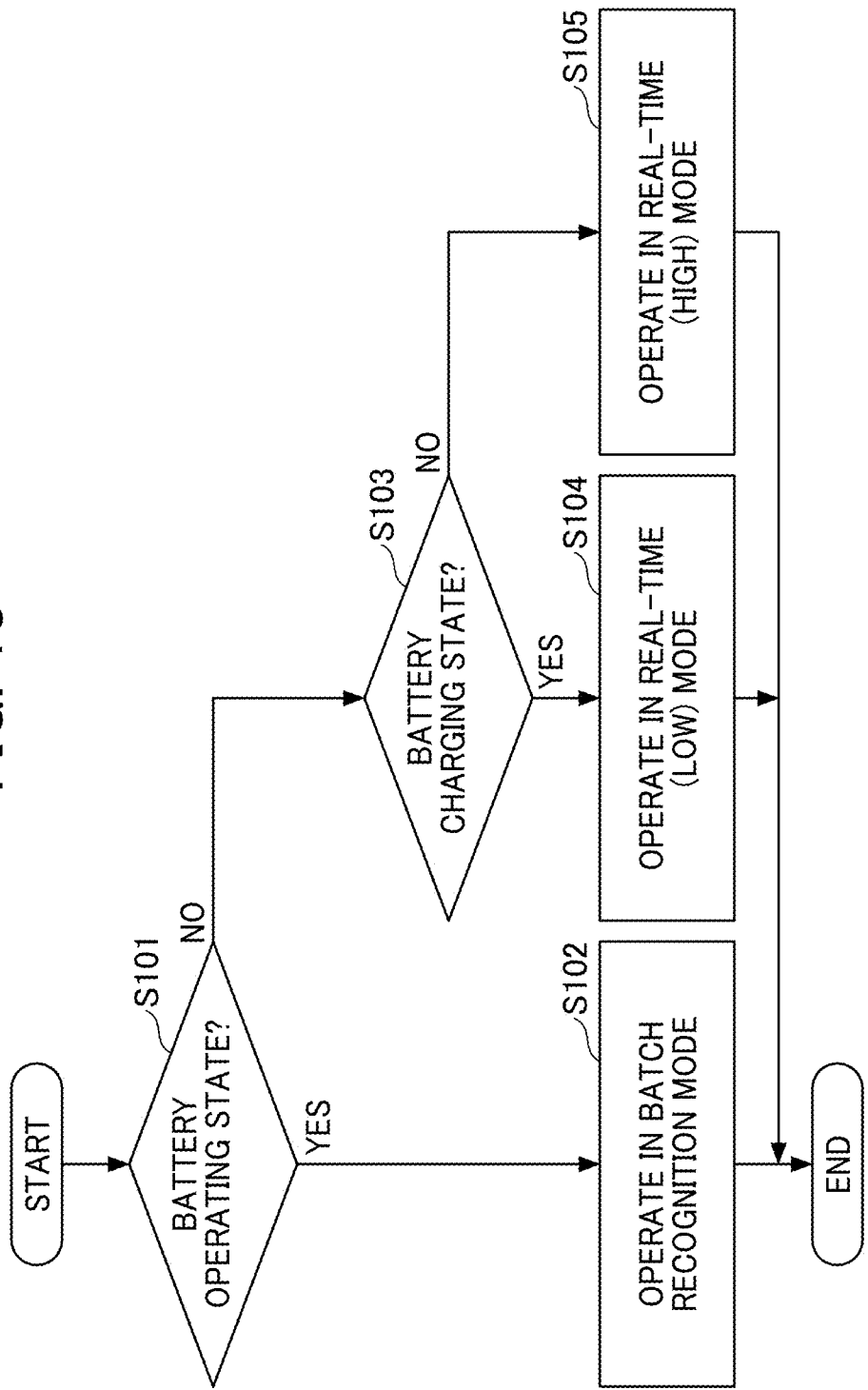
FIG. 18 is a flowchart presenting an example of a procedure in which the display apparatus controls the frequency of the recognition processing in accordance with the power supply state.

Control of Frequency of Recognition Processing in Accordance with Power Supply State FIG. 18 is a flowchart presenting an example of a procedure in which the display apparatus 2 controls the frequency of the recognition processing in accordance with the power supply state. The processing in FIG. 18 starts when the handwriting input display controller 23 informs the handwriting input storage unit 25 of end of the stroke (S8 in FIG. 10).

The handwriting input display controller 23 determines whether the power supply state informed by the power supply controller 34 is the battery operating state A (S101).

Figure 11:
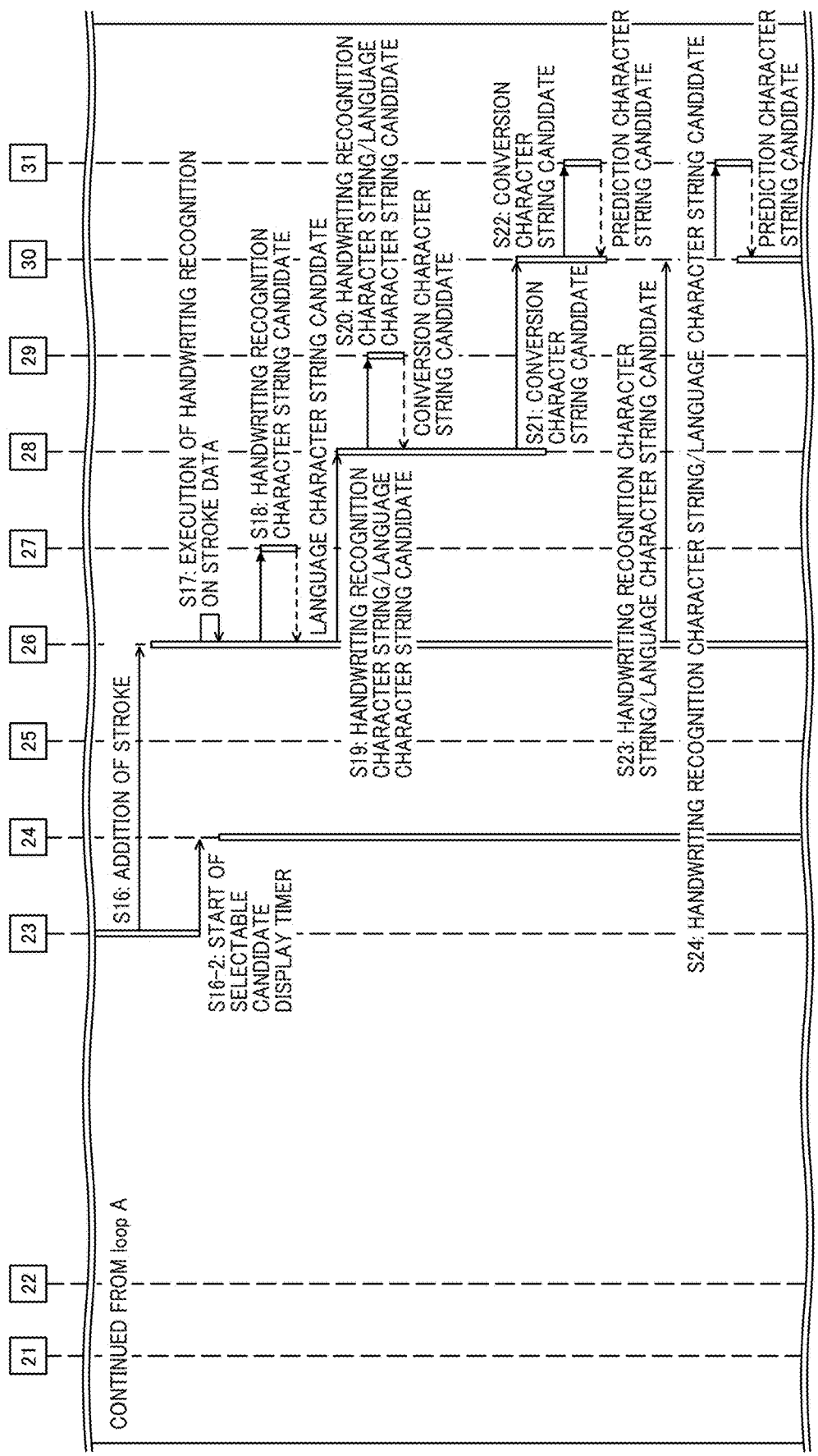
FIG. 11 is a sequence diagram illustrating the example of the processing in which the display apparatus displays the character string candidates.
Figure 12:
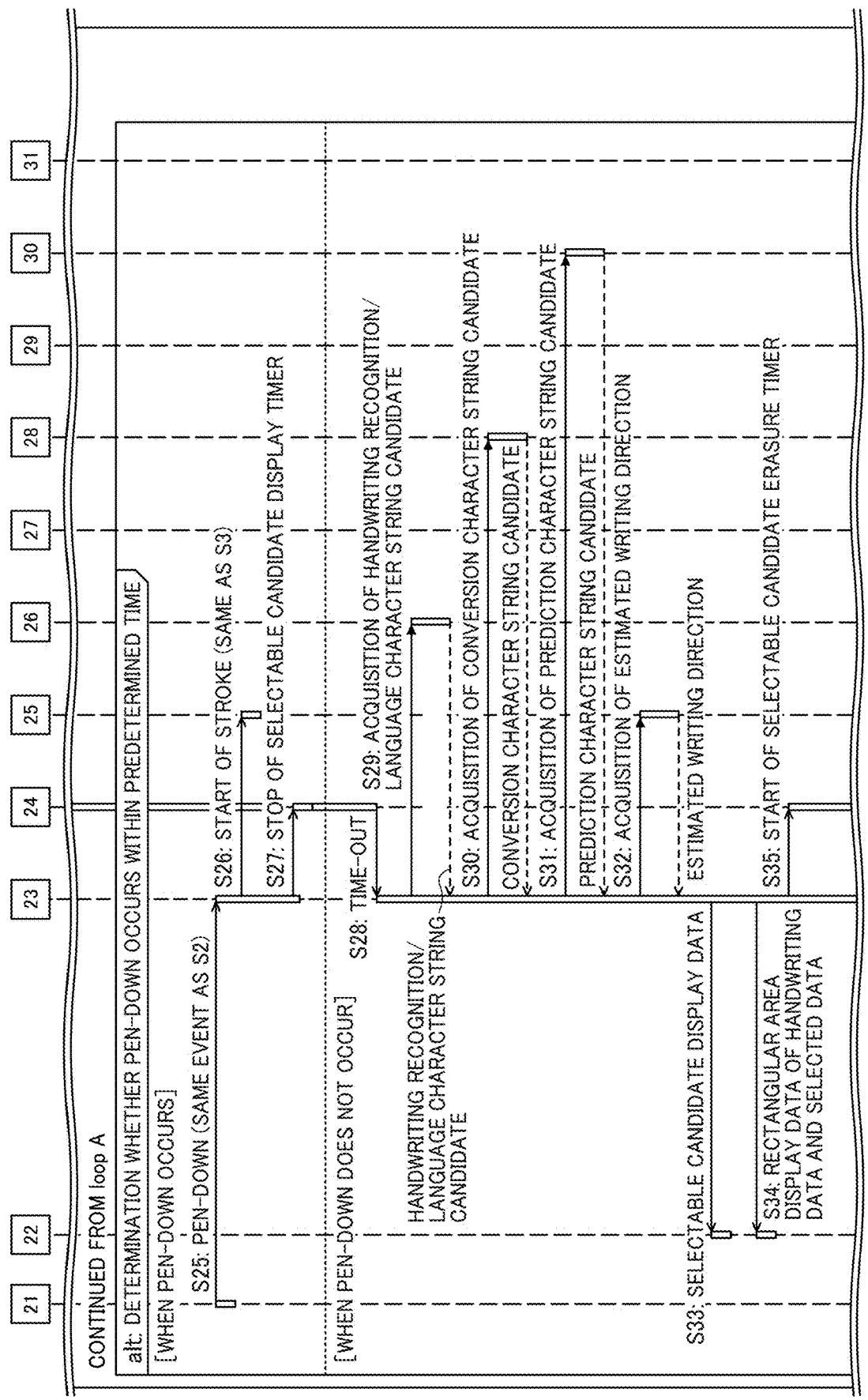
FIG. 12 is a sequence diagram illustrating the example of the processing in which the display apparatus displays the character string candidates.
Figure 13:
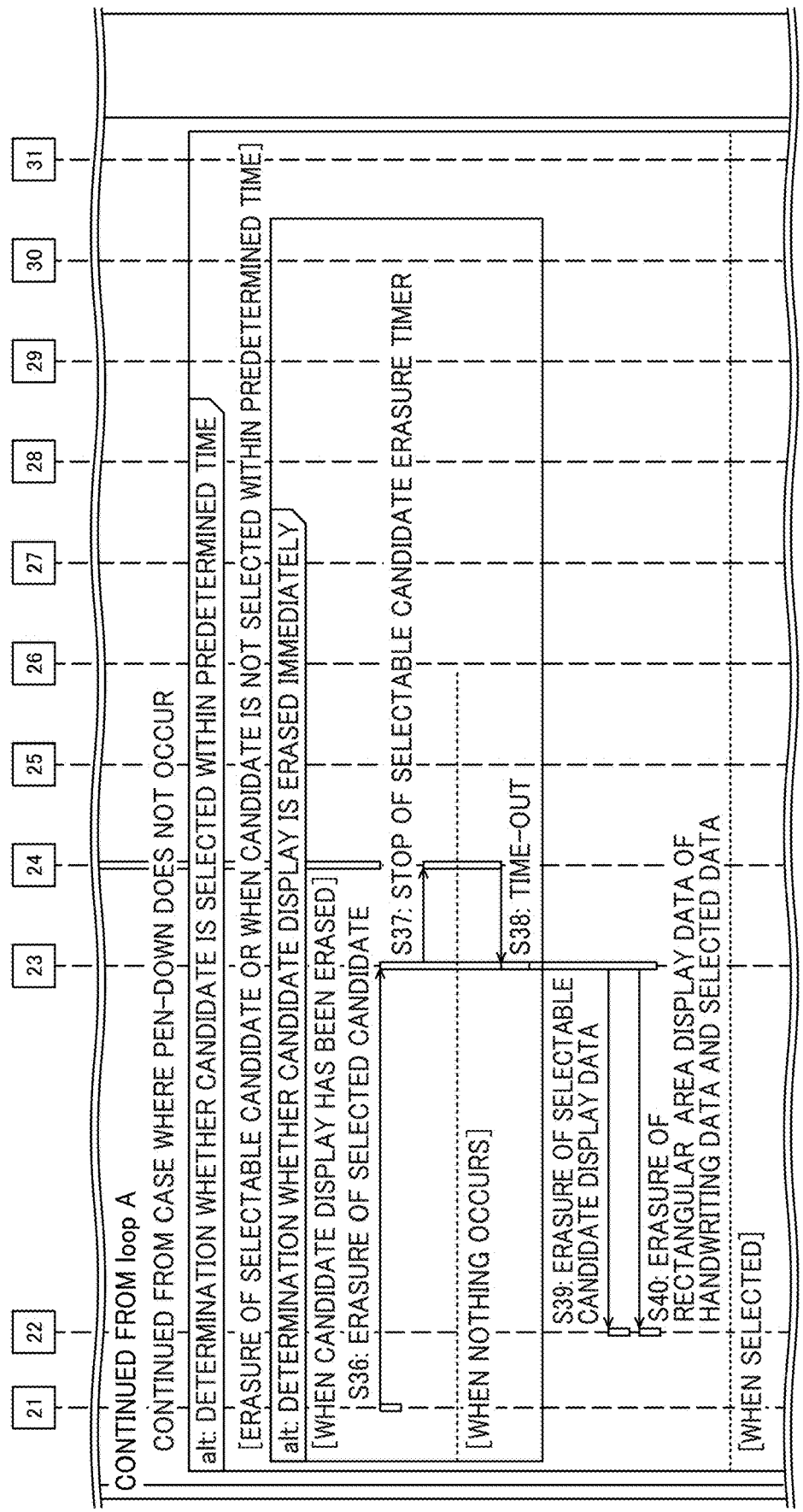
FIG. 13 is a sequence diagram illustrating the example of the processing in which the display apparatus displays the character string candidates.
Figure 14:
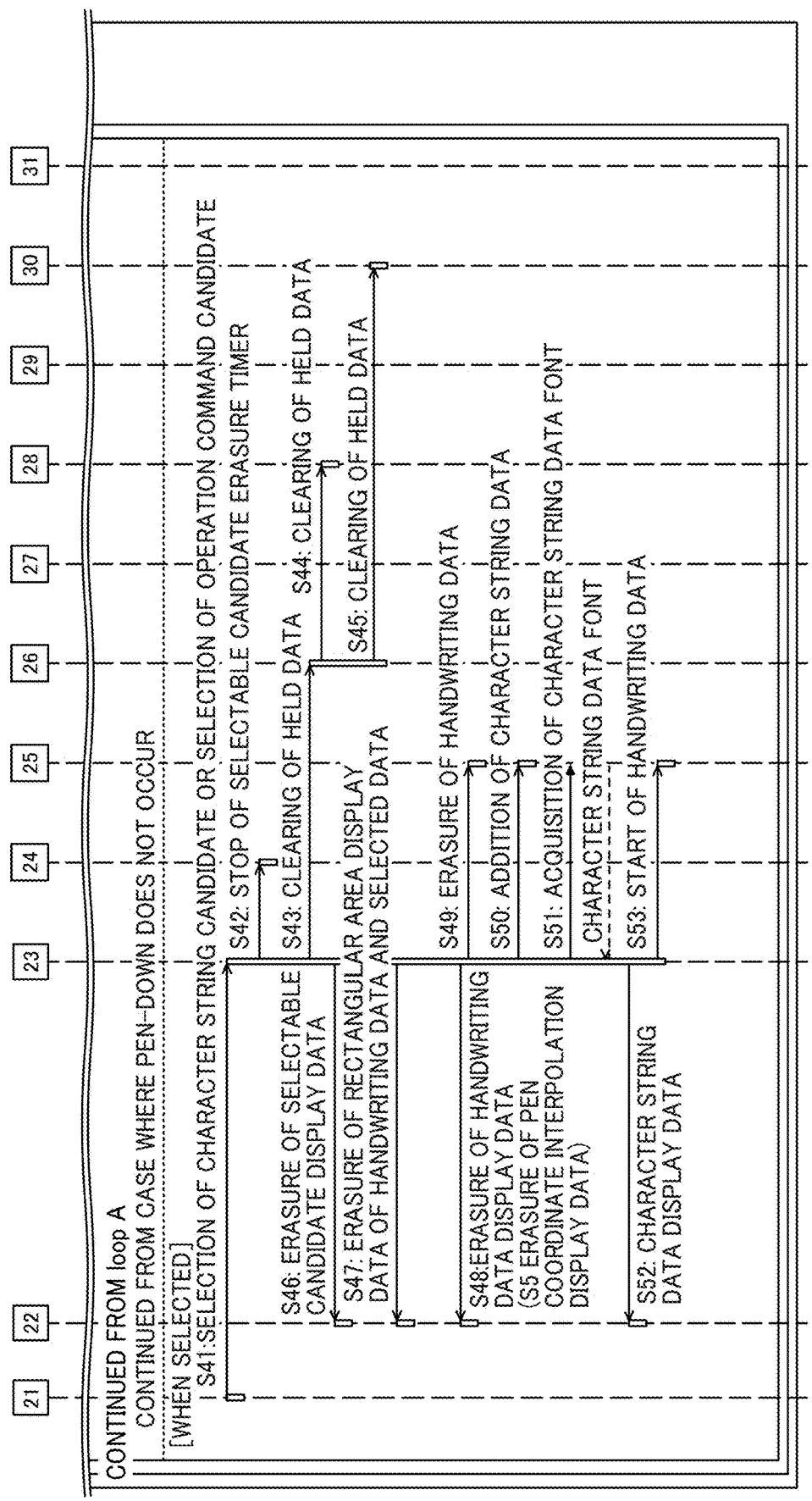
FIG. 14 is a sequence diagram illustrating the example of the processing in which the display apparatus displays the character string candidates.

When the determination of step S101 is Yes, the handwriting input display controller 23 sets the character recognition mode to the batch mode (S102). Thus, the stroke data is not informed to the handwriting recognition controller 26 (step S16 in FIG. 11 is not performed) until the user gives an instruction.

When the determination of step S101 is No, the handwriting input display controller 23 determines whether or not the battery is in the battery charging state B (S103).

When the determination of step S103 is Yes, the handwriting input display controller 23 sets the character recognition mode to the real-time (low) mode (S104). Thus, the handwriting input display controller 23 counts the number of pieces of stroke data added to the handwriting input storage unit 25, and does not inform the handwriting recognition controller 26 of the number of strokes until the number of strokes reaches the number of strokes associated with the real-time (low) mode in the frequency control table (step S16 in FIG. 11 is not performed).

When the determination of step S103 is No, the handwriting input display controller 23 sets the character recognition mode to the real-time (high) mode (S105). Thus, the handwriting input display controller 23 informs the handwriting recognition controller 26 of stroke data for each piece of stroke data (performs step S16 presented in FIG. 11 for each stroke data).

Emergency Processing

Figure 19:
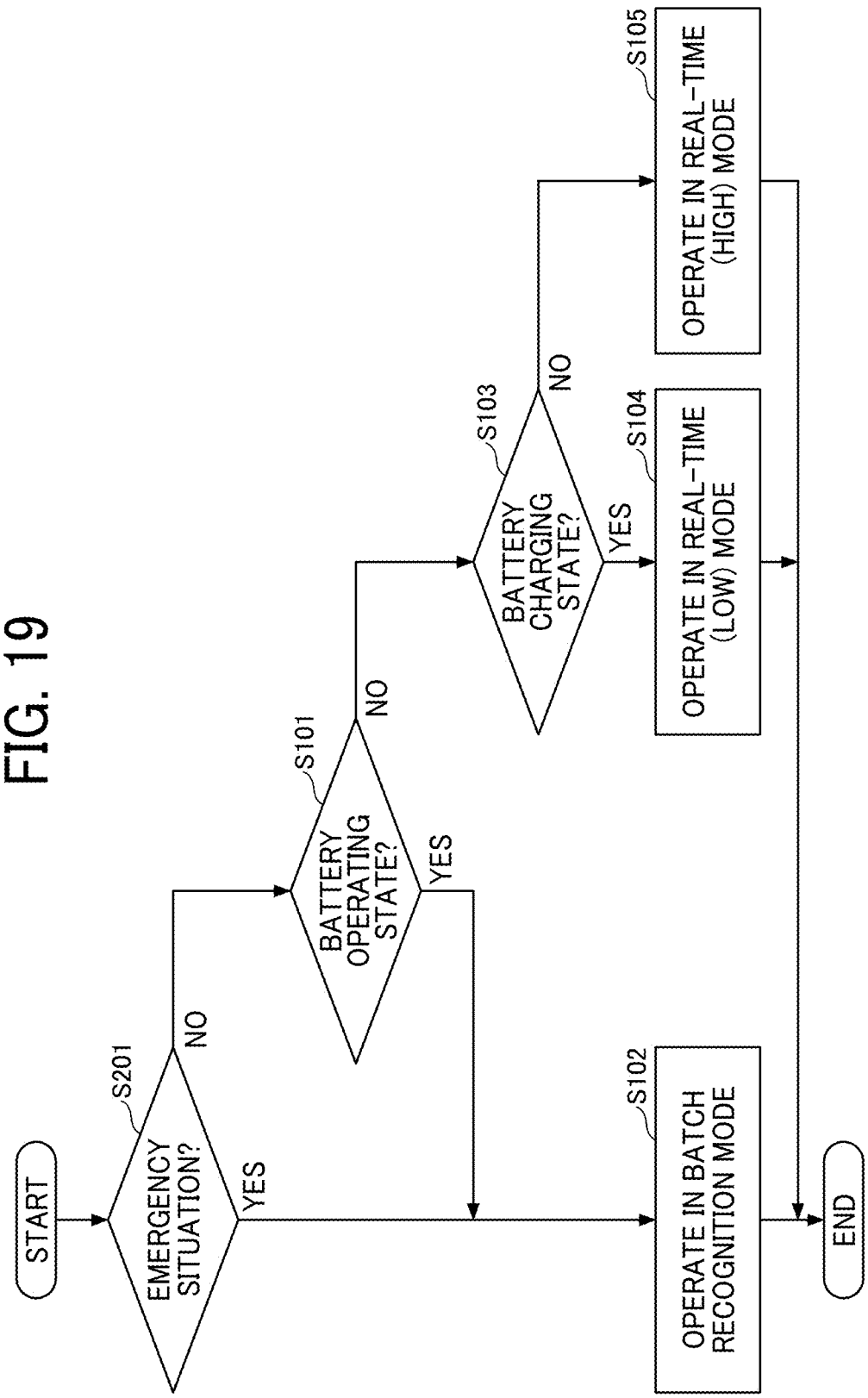
FIG. 19 is a flowchart presenting an example of a procedure in which the display apparatus controls the frequency of the recognition processing when the display apparatus has received emergency information.

Next, referring to FIG. 19, processing performed when the display apparatus 2 has received emergency information will be described. FIG. 19 is a flowchart presenting an example of a procedure in which the display apparatus 2 controls the frequency of the recognition processing when the display apparatus 2 has received emergency information.

The emergency information receiving unit 35 determines whether or not emergency information has been received (S201). The emergency information is information indicating that a situation has occurred in which power consumed by the display apparatus 2 should be reduced. For indoors, the emergency information is information indicating that a situation has occurred in which power should be preferentially given to another apparatuses rather than power of the display apparatus 2. For outdoors, the emergency information is information indicating that a situation has occurred in which the battery operation time should be increased.

The emergency information is, for example, information indicating occurrence of an earthquake, a power failure, a fire, water damage, or the like. Such a situation is likely to occur in a hospital or the like where emergency power is supplied in an emergency situation. Not limited to hospitals, there are many facilities that want to preferentially supply power to other apparatuses rather than the display apparatus 2.

The emergency information may be transmitted from a server in a facility where the display apparatus 2 is installed or may be transmitted from a server on a cloud. Alternatively, the data may be transmitted via a local area network (LAN) or a telephone line.

When the determination of step S201 is Yes, the handwriting input display controller 23 sets the character recognition mode to the batch mode (S102). Thus, the stroke data is not informed to the handwriting recognition controller 26 (step S16 in FIG. 11 is not performed) until the user gives an instruction. The subsequent processing may be the same as in FIG. 18.

Batch Conversion Accompanied by Improvement of Power Supply State

A battery cable may be connected to the display apparatus 2 whose power supply state is the battery operating state A. Since there is stroke data on which the user has not executed the recognition processing with high possibility, automatically performing batch recognition can reduce the time and effort of the user.

Figure 20:
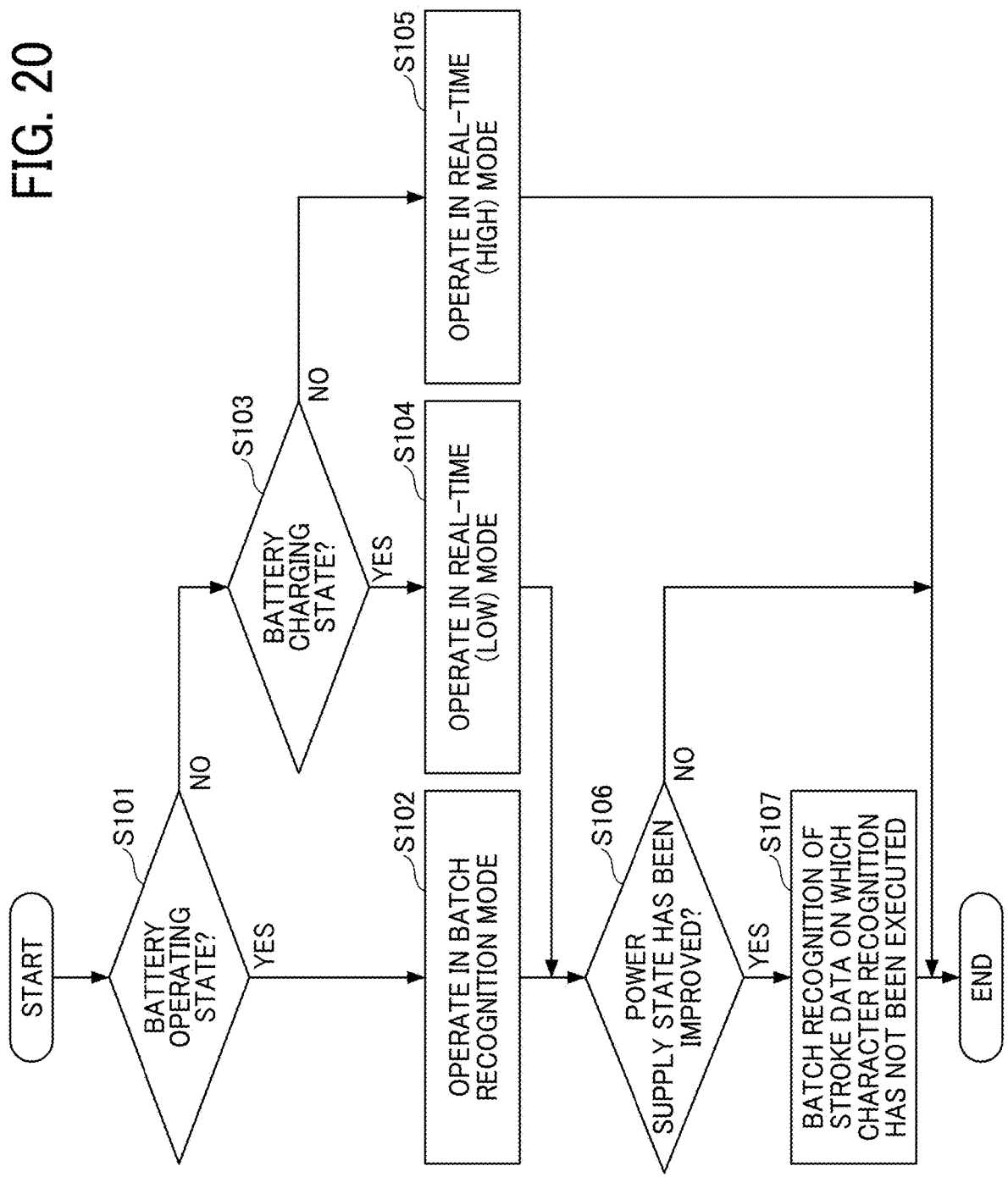
FIG. 20 is a flowchart presenting an example of processing in which the display apparatus performs batch recognition when the power supply state has been improved.

FIG. 20 is a flowchart presenting an example of processing in which the display apparatus 2 performs batch recognition when the power supply state has been improved. Points different from those in FIG. 18 are mainly described with reference to FIG. 20.

After it is determined in step S102 that the mode is the batch mode, or after it is determined in step S104 that the mode is the real-time (low) mode, the handwriting input display controller 23 determines whether the power supply state has been improved based on the power supply state (S106). That is, when the power supply state changes from the battery operating state A to the battery charging state B (or the AC power supply operating state C), or when the power supply state changes from the battery charging state B to the AC power supply operating state C, it is determined that the power supply state has improved.

When the determination of step S106 is Yes, the handwriting input display controller 23 performs batch recognition of stroke data that is stored in the handwriting input storage unit 25 and is not subjected to character recognition (S107).

FIG. 21 schematically illustrates stored data stored in the handwriting input storage unit 25. One row in FIG. 21 represents a piece of stroke data. One of stored items includes items of DataId, Type, PenId, Color, Width, Pattern, Angle, AccountId, StartPoint, StartTime, EndPoint, EndTime, Point, and Pressure.

DataId is the identification information on stroke data. Type is the type of stroke data. The types include a stroke (Stroke) and a text (Text). The type of handwriting input storage data 801 and 802 is Stroke, and the type of handwriting input storage data 803 is Text. PenId, Color, Width, Pattern, Angle, and AccountId are the ID, color, thickness, line type, and orientation of the pen 2500. StartPoint indicates the coordinates of the start point of stroke data, and StartTime is the time of the start point of stroke data. EndPoint indicates the coordinates of the end point of stroke data, and EndTime is the time of the end point of stroke data. Point is the coordinate point sequence from the start point to the end point, and Pressure is the writing pressure from the start point to the end point.

The handwriting input display controller 23 acquires the stored data of Type=Stroke from the handwriting input storage unit 25 and requests the handwriting recognition controller 26 to perform recognition processing.

In this way, when there is stroke data on which recognition processing has not been executed, batch recognition is performed in accordance with the improvement in the power supply state to reduce the time and effort of the user.

Control of Extent of Search Range in Accordance with Power Supply State

In addition to controlling the frequency of the recognition processing in accordance with the power supply state, the range of pattern matching of stroke data and the extent of the search range of conversion candidates are controlled to further suppress power consumption.

First, the range of pattern matching will be described. As described with reference to FIG. 15, a piece of stroke data is pattern-matched with basic strokes. Since each basic stroke is identified as being extracted from Japanese, English, a figure, or a numeral, the number of basic strokes to be subjected to pattern matching is reduced to reduce power consumption. For example, the handwriting recognition controller 26 controls the extent of the search range of basic strokes to be compared in the recognition processing in accordance with the power supply state as follows.

In the battery operating state A (batch mode), the handwriting recognition controller 26 performs pattern matching only with basic strokes of Japanese. Only the basic shape dictionary for Japanese is searched.

In the battery charging state (real-time (low) mode), the handwriting recognition controller 26 performs pattern matching only with basic strokes of Japanese and numerals. Only basic shape dictionaries for Japanese and numerals are searched.

In the AC power supply operating state C (real-time (high) mode), the handwriting recognition controller 26 performs pattern matching with all basic strokes. All the basic shape dictionaries are searched.

The search range of conversion candidates will be described. As illustrated in FIG. 7, the display apparatus 2 includes the character string conversion dictionary unit 29 and the predictive conversion dictionary unit 31. Since the character string conversion dictionary unit 29 and the predictive conversion dictionary unit 31 are also divided into Japanese, English, figures, and numerals, reducing the types of dictionaries to be searched can reduce power consumption.

Further, the character string conversion controller 28 can convert the character 5a "ぎ" displayed as the handwriting recognition character string candidate 506 into the character string 5b "議事録" and the character string 5c "技量試" displayed as the conversion character string candidates 507 using the character string conversion dictionary unit 29. However, power consumption differs depending on how many characters of the conversion character string candidates 507 are searched for. That is, the power consumption can be reduced by reducing the number of characters of the character string acquired from the dictionary. For example, by limiting each of the conversion character string candidates 507 of three characters of the character string 5b "議事録" and the character string 5c "技量試" into two characters "議事" and "技量", the search time can be decreased and the power consumption can be reduced.

Similarly, for the character string/predictive conversion candidate 508, for example, limiting the number of characters of the character string 5e "議事録の送付先" displayed as the character string/predictive conversion candidate 508 to "議事録の" (meaning "of minutes") or "議事録を" (meaning "for minutes"), the search time can be decreased and the power consumption can be reduced.

As described above, the character string conversion controller 28 and the predictive conversion controller 30 control the extent of the search range of conversion candidates in accordance with the power supply state as follows, for example.

In the battery operating state A (batch mode), only the Japanese dictionary is searched. The number of characters of the conversion character string candidate 507 is limited to one character, and the number of characters of the character string/predictive conversion candidate 508 is limited to three characters.

In the battery charging state (real-time (low) mode), only the Japanese and numeric dictionaries are set as the search range. The number of characters of the conversion character string candidate 507 is limited to two characters, and the number of characters of the character string/predictive conversion candidate 508 is limited to four characters.

The flowchart is similar to FIG. 18, and in steps S102, S104, and S105, the handwriting recognition controller 26 controls the range of pattern matching, and the character string conversion controller 28 and the predictive conversion controller 30 control the search range of conversion candidates.

As described above, the range of pattern matching of stroke data and the search range of conversion candidates are controlled to further suppress power consumption.

Display Example of Power Supply State

Figure 22A:
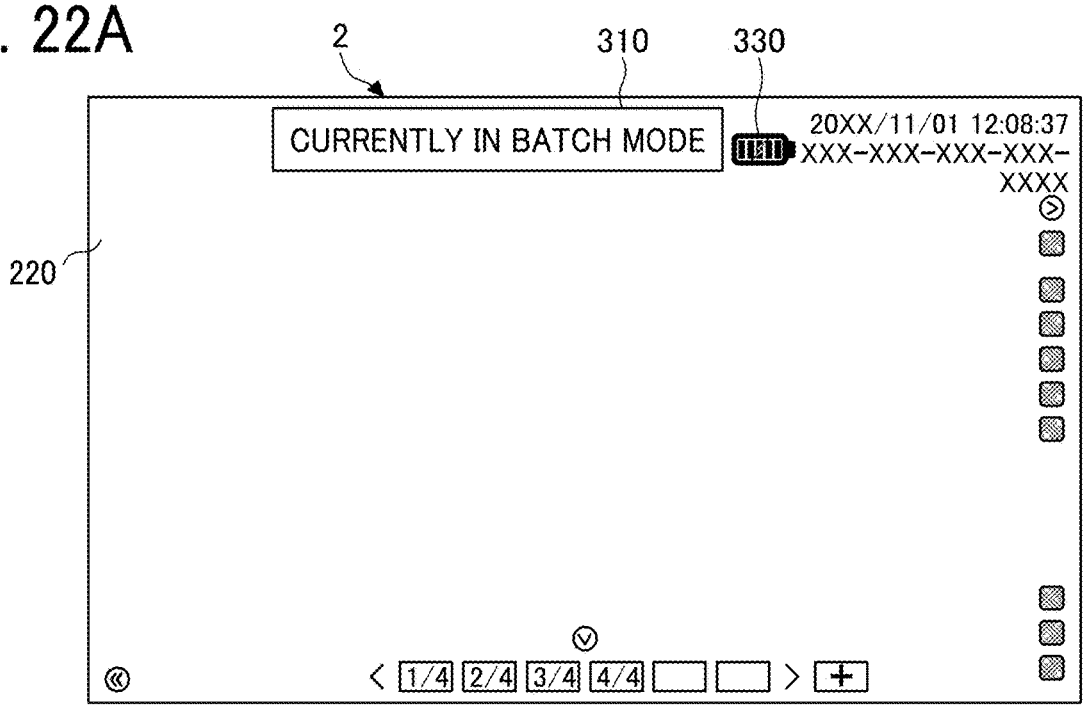
FIGS. 22A to 22D are views illustrating examples of power supply states displayed on a display of the display apparatus.

FIGS. 22A to 22D are views illustrating examples of power supply states displayed on the display 220 of the display apparatus 2. FIG. 22A illustrates a display example of the display 220. The display 220 displays a battery icon 330 indicating the power supply state (see FIG. 22D).

Figure 22B:
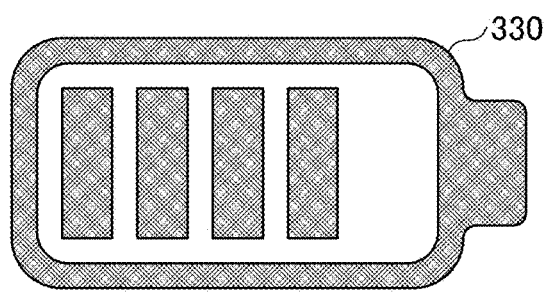
Figure 22C:
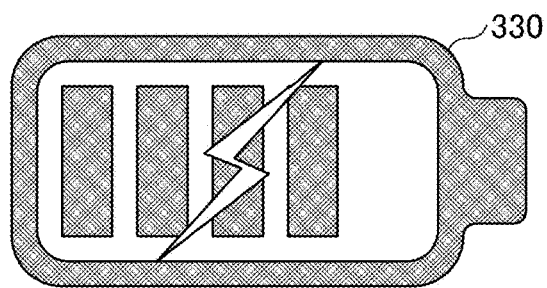
Figure 22D:
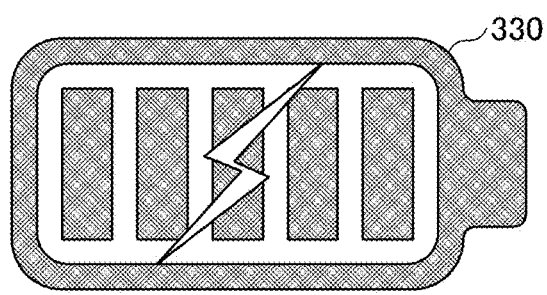

FIG. 22B illustrates an icon 330 in the battery operating state A. FIG. 22C illustrates an icon 330 in the battery charging state B. FIG. 22D illustrates an icon 330 in the AC power supply operating state C. The user can recognize the current power supply state by looking at the icon 330.

The display apparatus 2 may additionally display the character recognition mode as illustrated in FIG. 22A. In FIG. 22A, a message 310 "currently in batch mode" is displayed in accordance with the battery operating state A. The user can recognize how the handwriting data is converted. In the battery charging state B, a message "currently in real-time (low) mode" is displayed, and in the AC power supply operating state C, a message "currently in real-time (high) mode" is displayed. The message 310 and the icon 330 may be normally displayed, may be periodically displayed, or may be displayed in response to a user operation.

As described above, according to the present embodiment, by controlling (reducing) the frequency at which the recognition processing is executed in accordance with the power supply state, the power consumption can be reduced, the driving time of the battery can be increased, and the charging time can be decreased.

In one embodiment, other configuration example of the display apparatus 2 will be described as follows.

Another Configuration Example 1 of Display Apparatus

While the display apparatus 2 of the present embodiment is described as having a large touch panel, the display apparatus 2 is not limited to having a touch panel.

FIG. 23 illustrates another configuration example of the display apparatus 2. In FIG. 23, a projector 411 is installed on the upper side of a normal whiteboard 413. The projector 411 corresponds to the display apparatus 2. The normal whiteboard 413 is not a flat panel display integrated with a touch panel, but is a whiteboard on which a user directly performs handwriting with a marker. Note that the whiteboard may be a blackboard, and may be any member having a flat surface with a size large enough to project an image.

The projector 411 has an optical system with an ultra-short focal length, and can project an image with little distortion on the whiteboard 413 from a distance of about 10 cm from the whiteboard 413. This image may be transmitted from a personal computer (PC) connected wirelessly or by wire, or may be stored in the projector 411.

The user uses a dedicated electronic pen 2501 to perform handwriting on the whiteboard 413. The electronic pen 2501 includes, for example, a light emitter at a tip end portion thereof. When the user presses the light emitter against the whiteboard 413 for handwriting, the switch of the light emitter is turned on and the light emitter emits light. The light has wavelengths of near infrared or infrared, and hence the light is invisible to the user. The projector 411 includes a camera that captures an image of the light emitter to analyze the image and identify the direction of the electronic pen 2501. The electronic pen 2501 transmits sound waves together with light emission, and the projector 411 calculates the distance based on the arrival time of the sound waves. The position of the electronic pen 2501 can be identified by the direction and the distance. Handwriting data is drawn (projected) at the position of the electronic pen 2501.

The projector 411 projects a menu 430. When the user presses a button of the menu 430 with the electronic pen 2501, the projector 411 identifies the pressed button based on the position of the electronic pen 2501 and the ON signal of the switch. For example, when a save button 431 is pressed, handwriting data (coordinate point sequence) handwritten by the user is stored in the projector 411. The projector 411 stores the handwriting information in a predetermined server 412, a USB memory 2600, or the like. The handwriting information is stored for each page. Since the handwriting information is stored in the form of coordinates instead of image data, the user can re-edit the image data. However, in the present embodiment, since the operation command can be called by handwriting, the menu 430 may not be displayed.

Still Another Configuration Example 2 of Display Apparatus

Figure 24:
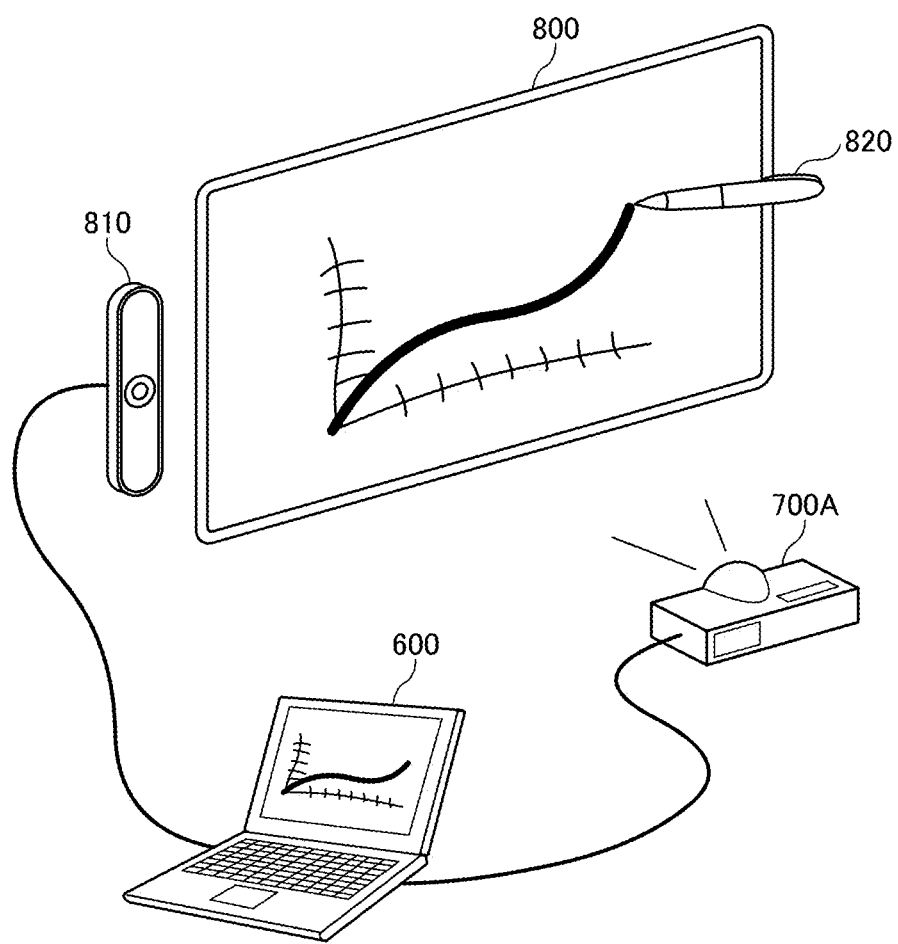
FIG. 24 illustrates still another configuration example of the display apparatus.

FIG. 24 illustrates still another configuration example of the display apparatus 2. In the example of FIG. 24, the display apparatus 2 includes a terminal device 600, an image projector 700A, and a pen motion detector 810.

The terminal device 600 is connected to the image projector 700A and the pen motion detector 810 by wire. The image projector 700A projects image data input by the terminal device 600 onto a screen 800.

The pen motion detector 810 communicates with an electronic pen 820 and detects a motion of the electronic pen 820 in the vicinity of the screen 800. Specifically, the electronic pen 820 detects coordinate information indicating a point indicated by the electronic pen 820 on the screen 800 (the detection method may be the same as in FIG. 23), and transmits the coordinate information to the terminal device 600.

Based on the coordinate information received from the pen motion detector 810, the terminal device 600 generates image data of handwriting data input by the electronic pen 820, and causes the image projector 700A to draw the image of the handwriting data on the screen 800.

The terminal device 600 combines a background image projected by the image projector 700A and the image of the handwriting data input by the electronic pen 820 to generate superimposed image data.

Yet Another Configuration Example 3 of Display Apparatus

Figure 25:
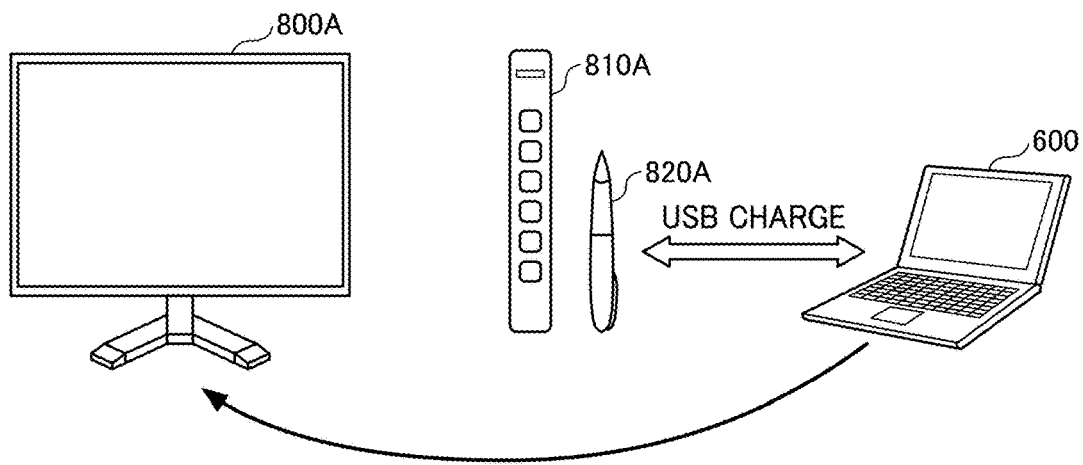
FIG. 25 illustrates yet another configuration example of the display apparatus.

FIG. 25 illustrates yet another configuration example of the display apparatus 2. In the example of FIG. 25, the display apparatus 2 includes a terminal device 600, a display 800A, and a pen motion detector 810A.

The pen motion detector 810A is disposed in the vicinity of the display 800A, detects coordinate information indicating a point indicated by an electronic pen 820A on the display 800A (the detection method may be the same as the method in FIG. 23), and transmits the coordinate information to the terminal device 600. In the example of FIG. 25, the electronic pen 820A may be charged by the terminal device 600 via the USB connector.

The terminal device 600 generates image data of an image of handwriting data input by the electronic pen 820A based on the coordinate information received from the pen motion detector 810, and displays the image on the display 800A.

Further Configuration Example 4 of Display Apparatus

Figure 26:
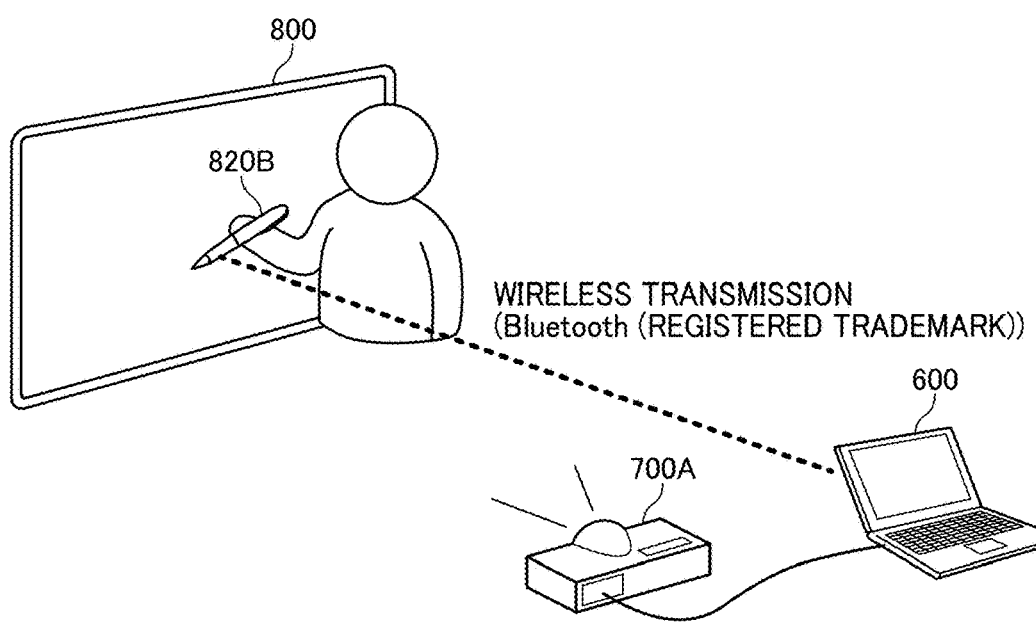
FIG. 26 illustrates a further configuration example of the display apparatus.

FIG. 26 illustrates a further configuration example of the display apparatus 2. In the example of FIG. 26, the display apparatus 2 includes a terminal device 600 and an image projector 700A.

The terminal device 600 performs wireless communication (using, for example, Bluetooth (registered trademark)) with an electronic pen 820B and receives coordinate information of a point indicated by the electronic pen 820B on a screen 800. The electronic pen 820B may read minute position information formed on the screen 800, or the coordinate information may be received from the screen 800.

Based on the received coordinate information, the terminal device 600 generates image data of an image of handwriting data input by the electronic pen 820, and causes the image projector 700A to project the image of the handwriting data on the screen 800.

The terminal device 600 combines a background image projected by the image projector 700A and the image of the handwriting data input by the electronic pen 820 to generate superimposed image data.

As described above, each embodiment described above can be applied to various system configurations.

Variations

The above-described embodiment is illustrative and do not limit the present disclosure. Thus, numerous additional modifications and variations are possible in light of the above teachings. Any one of the above-described operations may be performed in various other ways, for example, in an order different from the one described above.

The character string is stored in the display apparatus 2 as a character code, and the handwriting data is stored in the display apparatus 2 as coordinate point data. In addition, the data may be stored in various storage media or a storage device on a network, and later downloaded from the display apparatus 2 and reused. The display apparatus 2 that reuses the data may be any display apparatus and may be a general-purpose information processing apparatus. Thus, the user can reproduce the handwritten content on a different display apparatus 2 to continue the conference or the like.

For example, although the electronic whiteboard has been described as an example in the present embodiment, the electronic whiteboard may be referred to as an electronic writing board, an electronic information board, a handwriting input apparatus, or the like. The present embodiment can be suitably applied to any information processing apparatus having a touch panel. Examples of the information processing apparatus equipped with a touch panel include output devices such as projectors (PJ) and digital signage, head up display (HUD) devices, industrial machines, imaging apparatuses, sound collectors, medical devices, network home appliances, notebook personal computers (PCs), mobile phones, smartphones, tablet terminals, game machines, personal digital assistants (PDAs), digital cameras, wearable PCs, and desktop PCs.

Further, in the present embodiment, the coordinates of the pen are detected by the method of detecting the coordinates of the pen tip using the touch panel. However, the coordinates of the pen tip may be detected using ultrasonic waves. The pen transmits ultrasonic waves together with light emission, and the display apparatus 2 calculates the distance by the arrival time of the ultrasonic waves. The position of the pen can be identified by the direction and the distance. The projector draws (projects) the locus of the pen as stroke data.

The example configuration like one illustrated in FIG. 7 is divided into blocks in accordance with main functions for easier understanding of the processing by the display apparatus 2. The present disclosure is not limited by the method of dividing the units of processing or the name of the processing. The processing of the display apparatus 2 can be divided into more units of processing in accordance with the content of the processing. One unit of processing may be divided so as to include more sub-units of processing.

Part of the processing performed by the display apparatus 2 may be performed by a server connected to the display apparatus 2 via a network.

In addition, in the present embodiment, even when the threshold value is exemplified for comparison, the threshold value is not limited to the exemplified value. Thus, in the present embodiment, for all the threshold values, the expression "less than the threshold value" and "equal to or less than the threshold value" have an equivalent meaning, and the expression "exceeding the threshold value" and "equal to or more than the threshold value" have an equivalent meaning. For example, the expression "less than the threshold value" when the threshold value is 11 has the same meaning as the expression "equal to or less than the threshold value" when the threshold value is 10. In addition, the expression "exceeding the threshold value" when the threshold value is 10 has the same meaning as the expression "exceeding the threshold value" when the threshold value is 11.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), a digital signal processor (DSP), and a field programmable gate array (FPGA), and existing circuit components arranged to perform the recited functions.

The handwriting input unit 21 is an example of an accepting unit, the handwriting recognition controller 26 is an example of a recognizing unit, the handwriting input display controller 23 is an example of a controller, and the emergency information reception unit 35 is an example of an emergency information receiving unit.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A display apparatus, comprising:
   circuitry configured to
   accept input of handwriting data;
   perform recognition processing of the handwriting data; and
   control a frequency of the recognition processing in accordance with a power supply state of the display apparatus, wherein
   the circuitry uses pattern recognition to perform the recognition processing, the pattern recognition comparing a basic stroke with the handwriting data, the basic stroke having a previously defined shape of stroke data for each stroke, and
   the circuitry controls an extent of a search range of the basic stroke to be subjected to the comparing in the recognition processing in accordance with the power supply state of the display apparatus.

2. The display apparatus according to claim 1, wherein the circuitry searches a dictionary for a character obtained in the recognition processing to display a character string that matches the search, and controls a type of the dictionary to be searched in accordance with the power supply state of the display apparatus.

3. The display apparatus according to claim 2, wherein the circuitry controls a number of characters of a character string to be acquired from the dictionary in accordance with the power supply state of the display apparatus.

4. The display apparatus according to claim 1, wherein the power supply state is one of a battery operating state in which the display apparatus operates using a battery, a battery charging state in which a power supply cable is connected to the display apparatus and the battery is being charged, and an alternating-current power supply operating state in which the power supply cable is connected to the display apparatus but the battery is not being charged.

5. The display apparatus according to claim 4, wherein the circuitry is further configured to
   execute the recognition processing in accordance with a user instruction in the battery operating state,
   execute the recognition processing for each predetermined number of pieces of stroke data in the battery charging state, the predetermined number being two or more, and
   execute the recognition processing for each stroke data in the alternating-current power supply operating state.

6. The display apparatus according to claim 5, wherein when the power supply state of the display apparatus has been improved, the circuitry executes the recognition processing on the handwriting data on which the recognition processing has not been executed.

7. The display apparatus according to claim 1, wherein the circuitry is further configured to reduce the frequency of the recognition processing in response to reception of emergency information from outside.

8. A control method executed by a display apparatus, the control method comprising:
   accepting input of handwriting data;
   performing recognition processing of the handwriting data; and
   controlling frequency of the recognition processing in accordance with a power supply state of the display apparatus, wherein
   the recognition processing is performed by using pattern recognition which compares a basic stroke with the handwriting data, the basic stroke having a previously defined shape of stroke data for each stroke, and
   the control method further includes controlling an extent of a search range of the basic stroke to be subjected to the comparing in the recognition processing in accordance with the power supply state of the display apparatus.

9. A non-transitory computer readable recording medium which, when executed by one or more processors, cause the processors to perform a control method comprising:
   accepting input of handwriting data;
   performing recognition processing of the handwriting data; and
   controlling frequency of the recognition processing in accordance with a power supply state of a display apparatus, wherein
   the recognition processing is performed by using pattern recognition which compares a basic stroke with the handwriting data, the basic stroke having a previously defined shape of stroke data for each stroke, and
   the control method further includes controlling an extent of a search range of the basic stroke to be subjected to the comparing in the recognition processing in accordance with the power supply state of the display apparatus.

10. The control method according to claim 8, further comprising:
    searching a dictionary for a character obtained in the recognition processing to display a character string that matches the search; and
    controlling a type of the dictionary to be searched in accordance with the power supply state of the display apparatus.

11. The control method according to claim 10, further comprising controlling a number of characters of a character string to be acquired from the dictionary in accordance with the power supply state of the display apparatus.

12. The control method according to claim 8, wherein the power supply state is one of a battery operating state in which the display apparatus operates using a battery, a battery charging state in which a power supply cable is connected to the display apparatus and the battery is being charged, and an alternating-current power supply operating state in which the power supply cable is connected to the display apparatus but the battery is not being charged.

13. The control method according to claim 12, further comprising:
    executing the recognition processing in accordance with a user instruction in the battery operating state;
    executing the recognition processing for each predetermined number of pieces of stroke data in the battery charging state, the predetermined number being two or more; and
    executing the recognition processing for each stroke data in the alternating-current power supply operating state.

14. The control method according to claim 13, further comprising executing, when the power supply state of the display apparatus has been improved, the recognition processing on the handwriting data on which the recognition processing has not been executed.

15. The control method according to claim 8, further comprising reducing the frequency of the recognition processing in response to reception of emergency information from outside.

16. The non-transitory computer readable recording medium according to claim 9, wherein the control method further comprises:
   searching a dictionary for a character obtained in the recognition processing to display a character string that matches the search; and
   controlling a type of the dictionary to be searched in accordance with the power supply state of the display apparatus.

17. The non-transitory computer readable recording medium according to claim 16, wherein the control method further comprises:
   controlling a number of characters of a character string to be acquired from the dictionary in accordance with the power supply state of the display apparatus.

18. The non-transitory computer readable recording medium according to claim 9, wherein the power supply state is one of a battery operating state in which the display apparatus operates using a battery, a battery charging state in which a power supply cable is connected to the display apparatus and the battery is being charged, and an alternating-current power supply operating state in which the power supply cable is connected to the display apparatus but the battery is not being charged.

19. The non-transitory computer readable recording medium according to claim 18, wherein the control method further comprises:
   executing the recognition processing in accordance with a user instruction in the battery operating state;
   executing the recognition processing for each predetermined number of pieces of stroke data in the battery charging state, the predetermined number being two or more; and
   executing the recognition processing for each stroke data in the alternating-current power supply operating state.

20. The non-transitory computer readable recording medium according to claim 9, wherein the control method further comprises:
   reducing the frequency of the recognition processing in response to reception of emergency information from outside.

* * * * *